(12) United States Patent
Khandekar et al.

(10) Patent No.: US 9,225,488 B2
(45) Date of Patent: Dec. 29, 2015

(54) SHARED SIGNALING CHANNEL

(75) Inventors: Aamod Khandekar, San Diego, CA (US); Alexei Gorokhov, San Diego, CA (US); Dhananjay Ashok Gore, San Diego, CA (US); Edward Harrison Teague, San Diego, CA (US); Min Dong, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 1778 days.

(21) Appl. No.: 11/261,158

(22) Filed: Oct. 27, 2005

(65) Prior Publication Data

US 2007/0097853 A1    May 3, 2007

(51) Int. Cl.
*H04J 1/00* (2006.01)
*H04L 5/00* (2006.01)

(52) U.S. Cl.
CPC ............ *H04L 5/0044* (2013.01); *H04L 5/0007* (2013.01); *H04L 5/0048* (2013.01); *H04L 5/0053* (2013.01)

(58) Field of Classification Search
USPC .................................. 370/207–208, 480–487
See application file for complete search history.

(56) References Cited

U.S. PATENT DOCUMENTS

| 4,393,276 A | 7/1983 | Steele et al. |
| 4,554,668 A | 11/1985 | Deman et al. |
| 4,747,137 A | 5/1988 | Matsunaga |
| 4,783,779 A | 11/1988 | Takahata et al. |
| 4,783,780 A | 11/1988 | Alexis |
| 4,975,952 A | 12/1990 | Mabey et al. |
| 5,008,900 A | 4/1991 | Critchlow et al. |
| 5,115,248 A | 5/1992 | Roederer et al. |

(Continued)

FOREIGN PATENT DOCUMENTS

| AU | 2005319084 | 4/2010 |
| CA | 2348137 | 11/2001 |

(Continued)

OTHER PUBLICATIONS

Digital cellular telecommunications system (Phase 2+); Mobile radio interface layer 3 specification (GSM 04.08 version 7..7.1 Release 1998); ETSI EN 300 940 V7.7.7 (Oct. 2000), pp. 1,2,91-93.

(Continued)

*Primary Examiner* — Phuc Tran
(74) *Attorney, Agent, or Firm* — Peng Zhu

(57) ABSTRACT

A shared signaling channel can be used in an Orthogonal Frequency Division Multiple Access (OFDMA) communication system to provide signaling, acknowledgement, and power control messages to access terminals within the system. The shared signaling channel can be assigned to a predetermined number of sub-carriers within any frame. The assignment of a predetermined number of sub-carriers to the shared signaling channel establishes a fixed bandwidth overhead for the channel. The actual sub-carriers assigned to the channel can be varied periodically, and can vary according to a predetermined frequency hopping schedule. The amount of signal power allocated to the signaling channel can vary on a per symbol basis depending on the power requirements of the communication link. The shared signaling channel can direct each message carried on the channel to one or more access terminals. Unicast messages allow the channel power to be controlled per the needs of individual communication links.

78 Claims, 5 Drawing Sheets

(56) References Cited

U.S. PATENT DOCUMENTS

| | | |
|---|---|---|
| 5,268,694 A | 12/1993 | Jan et al. |
| 5,282,222 A | 1/1994 | Fattouche et al. |
| 5,363,408 A | 11/1994 | Paik et al. |
| 5,371,761 A | 12/1994 | Daffara et al. |
| 5,384,810 A | 1/1995 | Amrany |
| 5,406,551 A | 4/1995 | Saito et al. |
| 5,410,538 A | 4/1995 | Roche et al. |
| 5,455,839 A | 10/1995 | Eyuboglu |
| 5,465,253 A | 11/1995 | Rahnema |
| 5,491,727 A | 2/1996 | Petit |
| 5,513,379 A | 4/1996 | Benveniste et al. |
| 5,539,748 A | 7/1996 | Raith |
| 5,548,582 A | 8/1996 | Brajal et al. |
| 5,553,069 A | 9/1996 | Ueno et al. |
| 5,583,869 A | 12/1996 | Grube et al. |
| 5,594,738 A | 1/1997 | Crisler et al. |
| 5,604,744 A | 2/1997 | Andersson et al. |
| 5,612,978 A | 3/1997 | Blanchard et al. |
| 5,625,876 A | 4/1997 | Gilhousenn et al. |
| 5,684,491 A | 11/1997 | Newman et al. |
| 5,726,978 A | 3/1998 | Frodigh et al. |
| 5,732,113 A | 3/1998 | Schmidl et al. |
| 5,745,487 A | 4/1998 | Hamaki |
| 5,768,276 A | 6/1998 | Diachina et al. |
| 5,790,537 A | 8/1998 | Yoon et al. |
| 5,812,938 A | 9/1998 | Gilhousen et al. |
| 5,815,488 A | 9/1998 | Williams et al. |
| 5,822,368 A | 10/1998 | Wang et al. |
| 5,828,650 A | 10/1998 | Malkamaki et al. |
| 5,838,268 A | 11/1998 | Frenkel et al. |
| 5,867,478 A | 2/1999 | Baum et al. |
| 5,870,393 A | 2/1999 | Yano et al. |
| 5,887,023 A | 3/1999 | Mabuchi et al. |
| 5,907,585 A | 5/1999 | Suzuki et al. |
| 5,920,571 A | 7/1999 | Houck et al. |
| 5,926,470 A | 7/1999 | Tiedemann, Jr. |
| 5,933,421 A | 8/1999 | Alamouti et al. |
| 5,949,814 A | 9/1999 | Odenwalder et al. |
| 5,953,325 A | 9/1999 | Willars et al. |
| 5,955,992 A | 9/1999 | Shattil et al. |
| 5,956,642 A | 9/1999 | Larsson et al. |
| 5,995,992 A | 11/1999 | Eckard et al. |
| 5,999,826 A | 12/1999 | Whinnett |
| 6,002,942 A | 12/1999 | Park et al. |
| 6,016,123 A | 1/2000 | Barton et al. |
| 6,038,150 A | 3/2000 | Yee et al. |
| 6,038,263 A | 3/2000 | Kotzin et al. |
| 6,038,450 A | 3/2000 | Brink et al. |
| 6,052,364 A | 4/2000 | Chalmers et al. |
| 6,061,337 A | 5/2000 | Light et al. |
| 6,067,315 A | 5/2000 | Sandin |
| 6,075,350 A | 6/2000 | Peng et al. |
| 6,075,797 A | 6/2000 | Thomas |
| 6,076,114 A | 6/2000 | Wesley |
| 6,088,345 A | 7/2000 | Sakoda et al. |
| 6,088,592 A | 7/2000 | Doner et al. |
| 6,108,323 A | 8/2000 | Gray et al. |
| 6,108,550 A | 8/2000 | Wiorek et al. |
| 6,112,094 A | 8/2000 | Dentt et al. |
| 6,128,776 A | 10/2000 | Kang et al. |
| 6,138,037 A | 10/2000 | Jaamies |
| 6,141,317 A | 10/2000 | Marchok et al. |
| 6,154,484 A | 11/2000 | Lee et al. |
| 6,169,910 B1 | 1/2001 | Tamil et al. |
| 6,172,993 B1 | 1/2001 | Kim et al. |
| 6,175,550 B1 | 1/2001 | Van Nee et al. |
| 6,175,650 B1 | 1/2001 | Sindhu et al. |
| 6,176,550 B1 | 1/2001 | Lamart et al. |
| 6,198,775 B1 | 3/2001 | Khayrallah et al. |
| 6,215,983 B1 | 4/2001 | Dogan et al. |
| 6,226,280 B1 | 5/2001 | Roark et al. |
| 6,232,918 B1 | 5/2001 | Wax et al. |
| 6,240,129 B1 | 5/2001 | Reusens et al. |
| 6,249,683 B1 | 6/2001 | Lundby et al. |
| 6,256,478 B1 | 7/2001 | Allen et al. |
| 6,271,946 B1 | 8/2001 | Chang et al. |
| 6,272,122 B1 | 8/2001 | Wee et al. |
| 6,310,704 B1 | 10/2001 | Dogan et al. |
| 6,317,435 B1 | 11/2001 | Tiedemann, Jr. et al. |
| 6,335,922 B1 | 1/2002 | Tiedemann, Jr. et al. |
| 6,337,659 B1 | 1/2002 | Kim et al. |
| 6,337,983 B1 | 1/2002 | Bonta et al. |
| 6,353,637 B1 | 3/2002 | Mansour et al. |
| 6,363,060 B1 | 3/2002 | Sarkar |
| 6,374,115 B1 | 4/2002 | Barnes et al. |
| 6,377,539 B1 | 4/2002 | Kang et al. |
| 6,377,809 B1 | 4/2002 | Rezaiifar et al. |
| 6,388,998 B1 | 5/2002 | Kasturia et al. |
| 6,393,008 B1 | 5/2002 | Cheng et al. |
| 6,393,012 B1 | 5/2002 | Pankaj |
| 6,401,062 B1 | 6/2002 | Murashima |
| 6,438,369 B1 | 8/2002 | Huang et al. |
| 6,449,246 B1 | 9/2002 | Barton et al. |
| 6,466,800 B1 | 10/2002 | Sydon et al. |
| 6,473,467 B1 | 10/2002 | Wallace et al. |
| 6,477,317 B1 | 11/2002 | Itokawa |
| 6,478,422 B1 | 11/2002 | Hansen |
| 6,483,820 B1 | 11/2002 | Davidson et al. |
| 6,487,243 B1 | 11/2002 | Hwang et al. |
| 6,496,790 B1 | 12/2002 | Kathavate et al. |
| 6,501,810 B1 | 12/2002 | Karim et al. |
| 6,507,601 B2 | 1/2003 | Parsa et al. |
| 6,519,462 B1 | 2/2003 | Lu et al. |
| 6,529,525 B1 | 3/2003 | Pecen et al. |
| 6,535,666 B1 | 3/2003 | Dogan et al. |
| 6,539,008 B1 | 3/2003 | Ahn et al. |
| 6,539,213 B1 | 3/2003 | Richards et al. |
| 6,542,485 B1 | 4/2003 | Mujtaba |
| 6,542,743 B1 | 4/2003 | Soliman |
| 6,563,806 B1 | 5/2003 | Yano et al. |
| 6,563,881 B1 | 5/2003 | Sakoda et al. |
| 6,577,739 B1 | 6/2003 | Hurtig et al. |
| 6,584,140 B1 | 6/2003 | Lee et al. |
| 6,590,881 B1 | 7/2003 | Wallace et al. |
| 6,597,746 B1 | 7/2003 | Amrany et al. |
| 6,601,206 B1 | 7/2003 | Marvasti |
| 6,614,857 B1 | 9/2003 | Buehrer et al. |
| 6,625,172 B2 | 9/2003 | Odenwalder et al. |
| 6,636,568 B2 | 10/2003 | Kadous et al. |
| 6,654,339 B1 | 11/2003 | Bohnke et al. |
| 6,654,431 B1 | 11/2003 | Barton et al. |
| 6,657,949 B1 | 12/2003 | Jones, IV et al. |
| 6,658,258 B1 | 12/2003 | Chen et al. |
| 6,674,787 B1 | 1/2004 | Dick et al. |
| 6,674,810 B1 | 1/2004 | Cheng et al. |
| 6,675,012 B2 | 1/2004 | Gray et al. |
| 6,678,318 B1 | 1/2004 | Lai et al. |
| 6,690,951 B1 | 2/2004 | Cuffaro et al. |
| 6,693,952 B1 | 2/2004 | Chuah et al. |
| 6,701,165 B1 | 3/2004 | Ho et al. |
| 6,704,571 B1 | 3/2004 | Moon |
| 6,711,400 B1 | 3/2004 | Aura et al. |
| 6,717,908 B2 | 4/2004 | Vijayan et al. |
| 6,721,568 B1 | 4/2004 | Gustavsson et al. |
| 6,724,719 B1 | 4/2004 | Tong et al. |
| 6,731,602 B1 | 5/2004 | Watanabe et al. |
| 6,735,244 B1 | 5/2004 | Hasegawa et al. |
| 6,744,743 B2 | 6/2004 | Walton et al. |
| 6,748,220 B1 | 6/2004 | Chow et al. |
| 6,751,444 B1 | 6/2004 | Meiyappan et al. |
| 6,751,456 B2 | 6/2004 | Bilgic |
| 6,754,511 B1 | 6/2004 | Halford et al. |
| 6,763,009 B1 | 7/2004 | Bedekar et al. |
| 6,765,969 B1 | 7/2004 | Vook et al. |
| 6,766,146 B1 | 7/2004 | Park et al. |
| 6,776,765 B2 | 8/2004 | Soukup et al. |
| 6,778,513 B2 | 8/2004 | Kasapi et al. |
| 6,785,341 B2 | 8/2004 | Walton et al. |
| 6,798,736 B1 | 9/2004 | Black et al. |
| 6,799,043 B2 | 9/2004 | Tiedemann, Jr. et al. |
| 6,802,035 B2 | 10/2004 | Catreux et al. |
| 6,804,307 B1 | 10/2004 | Popovic |
| 6,813,284 B2 | 11/2004 | Vayanos et al. |
| 6,821,535 B2 | 11/2004 | Nurmi et al. |

(56) References Cited

U.S. PATENT DOCUMENTS

| | | |
|---|---|---|
| 6,828,293 B1 | 12/2004 | Hazenkamp et al. |
| 6,829,293 B2 | 12/2004 | Jones et al. |
| 6,831,943 B1 | 12/2004 | Dabak et al. |
| 6,842,487 B1 | 1/2005 | Larsson |
| 6,850,481 B2 | 2/2005 | Wu et al. |
| 6,850,509 B2 | 2/2005 | Lee et al. |
| 6,862,271 B2 | 3/2005 | Medvedev et al. |
| 6,870,808 B1 | 3/2005 | Liu et al. |
| 6,870,826 B1 | 3/2005 | Ishizu et al. |
| 6,904,097 B2 | 6/2005 | Agami et al. |
| 6,904,283 B2 | 6/2005 | Li et al. |
| 6,904,550 B2 | 6/2005 | Sibecas et al. |
| 6,907,020 B2 | 6/2005 | Periyalwar et al. |
| 6,907,269 B2 | 6/2005 | Yamaguchi et al. |
| 6,909,707 B2 | 6/2005 | Rotstein et al. |
| 6,909,797 B2 | 6/2005 | Romsdahl et al. |
| 6,917,602 B2 | 7/2005 | Toskala et al. |
| 6,917,821 B2 | 7/2005 | Kadous et al. |
| 6,927,728 B2 | 8/2005 | Vook et al. |
| 6,928,047 B1 | 8/2005 | Xia et al. |
| 6,934,266 B2 | 8/2005 | Dulin et al. |
| 6,934,275 B1 | 8/2005 | Love et al. |
| 6,934,340 B1 | 8/2005 | Dollard |
| 6,940,842 B2 | 9/2005 | Proctor, Jr. |
| 6,940,845 B2 | 9/2005 | Benveniste |
| 6,954,448 B2 | 10/2005 | Farley et al. |
| 6,954,481 B1 | 10/2005 | Laroia et al. |
| 6,954,622 B2 | 10/2005 | Nelson et al. |
| 6,961,364 B1 | 11/2005 | Laroia et al. |
| 6,963,543 B2 | 11/2005 | Diep et al. |
| 6,970,682 B2 | 11/2005 | Crilly, Jr. et al. |
| 6,975,868 B2 | 12/2005 | Joshi et al. |
| 6,980,540 B1 | 12/2005 | Laroia et al. |
| 6,985,434 B2 | 1/2006 | Wu et al. |
| 6,985,453 B2 | 1/2006 | Lundby et al. |
| 6,985,466 B1 | 1/2006 | Yun et al. |
| 6,985,498 B2 | 1/2006 | Laroia et al. |
| 6,987,746 B1 | 1/2006 | Song |
| 6,993,342 B2 | 1/2006 | Kuchibhotla et al. |
| 7,002,900 B2 | 2/2006 | Walton et al. |
| 7,006,529 B2 | 2/2006 | Alastalo et al. |
| 7,006,557 B2 | 2/2006 | Subrahmanya et al. |
| 7,006,848 B2 | 2/2006 | Ling et al. |
| 7,009,500 B2 | 3/2006 | Rao et al. |
| 7,010,048 B1 | 3/2006 | Shattil et al. |
| 7,013,143 B2 | 3/2006 | Love et al. |
| 7,016,318 B2 | 3/2006 | Pankaj et al. |
| 7,016,319 B2 | 3/2006 | Baum et al. |
| 7,016,425 B1 | 3/2006 | Kraiem et al. |
| 7,020,110 B2 | 3/2006 | Walton et al. |
| 7,023,880 B2 | 4/2006 | El-Maleh et al. |
| 7,039,356 B2 | 5/2006 | Nguyen |
| 7,039,370 B2 | 5/2006 | Laroia et al. |
| 7,042,856 B2 | 5/2006 | Walton et al. |
| 7,042,857 B2 | 5/2006 | Krishnan et al. |
| 7,047,006 B2 | 5/2006 | Classon et al. |
| 7,050,402 B2 | 5/2006 | Schmidl et al. |
| 7,050,405 B2 | 5/2006 | Attar et al. |
| 7,050,759 B2 | 5/2006 | Gaal et al. |
| 7,054,301 B1 | 5/2006 | Sousa et al. |
| 7,061,898 B2 | 6/2006 | Hashem et al. |
| 7,069,009 B2 | 6/2006 | Li et al. |
| 7,072,315 B1 | 7/2006 | Liu et al. |
| 7,079,867 B2 | 7/2006 | Chun et al. |
| 7,085,574 B2 | 8/2006 | Gaal et al. |
| 7,095,708 B1 | 8/2006 | Alamouti et al. |
| 7,095,709 B2 | 8/2006 | Walton et al. |
| 7,099,299 B2 | 8/2006 | Liang et al. |
| 7,099,630 B2 | 8/2006 | Brunner et al. |
| 7,103,384 B2 | 9/2006 | Chun |
| 7,106,319 B2 | 9/2006 | Ishiyama |
| 7,113,808 B2 | 9/2006 | Hwang et al. |
| 7,120,134 B2 | 10/2006 | Tiedemann, Jr. et al. |
| 7,120,395 B2 | 10/2006 | Tong et al. |
| 7,126,928 B2 | 10/2006 | Tiedemann, Jr. et al. |
| 7,131,086 B2 | 10/2006 | Yamasaki et al. |
| 7,133,460 B2 | 11/2006 | Bae et al. |
| 7,139,328 B2 | 11/2006 | Thomas et al. |
| 7,142,864 B2 | 11/2006 | Laroia et al. |
| 7,145,940 B2 | 12/2006 | Gore et al. |
| 7,145,959 B2 | 12/2006 | Harel et al. |
| 7,149,199 B2 | 12/2006 | Sung et al. |
| 7,149,238 B2 | 12/2006 | Agee et al. |
| 7,151,761 B1 | 12/2006 | Palenius |
| 7,151,936 B2 | 12/2006 | Wager et al. |
| 7,154,936 B2 | 12/2006 | Bjerke et al. |
| 7,155,236 B2 | 12/2006 | Chen et al. |
| 7,157,351 B2 | 1/2007 | Cheng et al. |
| 7,161,971 B2 | 1/2007 | Tiedemann, Jr. et al. |
| 7,164,649 B2 | 1/2007 | Walton et al. |
| 7,164,696 B2 | 1/2007 | Sano et al. |
| 7,167,916 B2 | 1/2007 | Willen et al. |
| 7,170,937 B2 | 1/2007 | Zhou |
| 7,177,297 B2 | 2/2007 | Agrawal et al. |
| 7,177,351 B2 | 2/2007 | Kadous |
| 7,180,627 B2 | 2/2007 | Moylan et al. |
| 7,181,170 B2 | 2/2007 | Love et al. |
| 7,184,426 B2 | 2/2007 | Padovani et al. |
| 7,184,713 B2 | 2/2007 | Kadous et al. |
| 7,188,300 B2 | 3/2007 | Eriksson et al. |
| 7,197,282 B2 | 3/2007 | Dent et al. |
| 7,200,177 B2 | 4/2007 | Miyoshi et al. |
| 7,209,712 B2 | 4/2007 | Holtzman |
| 7,215,979 B2 | 5/2007 | Nakagawa et al. |
| 7,230,942 B2 | 6/2007 | Laroia et al. |
| 7,233,634 B1 | 6/2007 | Hassell Sweatman et al. |
| 7,236,747 B1 * | 6/2007 | Meacham et al. ............. 455/69 |
| 7,242,722 B2 | 7/2007 | Krauss et al. |
| 7,243,150 B2 | 7/2007 | Sher et al. |
| 7,248,559 B2 | 7/2007 | Ma et al. |
| 7,248,841 B2 | 7/2007 | Agee et al. |
| 7,254,158 B2 | 8/2007 | Agrawal |
| 7,257,167 B2 | 8/2007 | Lau |
| 7,257,406 B2 * | 8/2007 | Ji ................... 455/450 |
| 7,257,423 B2 | 8/2007 | Iochi et al. |
| 7,260,153 B2 | 8/2007 | Nissani |
| 7,280,467 B2 | 10/2007 | Smee et al. |
| 7,289,570 B2 | 10/2007 | Schmidl et al. |
| 7,289,585 B2 | 10/2007 | Sandhu et al. |
| 7,290,195 B2 | 10/2007 | Guo et al. |
| 7,292,651 B2 | 11/2007 | Li |
| 7,292,863 B2 | 11/2007 | Chen et al. |
| 7,295,509 B2 | 11/2007 | Laroia et al. |
| 7,313,086 B2 | 12/2007 | Aizawa et al. |
| 7,313,126 B2 | 12/2007 | Yun et al. |
| 7,313,174 B2 | 12/2007 | Alard et al. |
| 7,313,407 B2 | 12/2007 | Shapira et al. |
| 7,327,812 B2 | 2/2008 | Auer et al. |
| 7,330,701 B2 | 2/2008 | Mukkavilli et al. |
| 7,336,727 B2 | 2/2008 | Mukkavilli et al. |
| 7,349,371 B2 | 3/2008 | Schein et al. |
| 7,349,667 B2 | 3/2008 | Magee et al. |
| 7,356,000 B2 | 4/2008 | Oprescu-Surcobe et al. |
| 7,356,005 B2 | 4/2008 | Derryberry et al. |
| 7,356,073 B2 | 4/2008 | Heikkila |
| 7,359,327 B2 | 4/2008 | Oshiba |
| 7,363,055 B2 | 4/2008 | Castrogiovanni et al. |
| 7,366,223 B1 | 4/2008 | Chen et al. |
| 7,366,253 B2 | 4/2008 | Kim et al. |
| 7,366,520 B2 | 4/2008 | Haustein et al. |
| 7,369,531 B2 | 5/2008 | Cho et al. |
| 7,372,911 B1 | 5/2008 | Lindskog et al. |
| 7,372,912 B2 | 5/2008 | Seo et al. |
| 7,379,489 B2 | 5/2008 | Zuniga et al. |
| 7,382,764 B2 | 6/2008 | Uehara |
| 7,392,014 B2 | 6/2008 | Baker et al. |
| 7,394,865 B2 | 7/2008 | Borran et al. |
| 7,403,745 B2 | 7/2008 | Dominique et al. |
| 7,403,748 B1 | 7/2008 | Keskitalo et al. |
| 7,406,119 B2 | 7/2008 | Yamano et al. |
| 7,406,336 B2 | 7/2008 | Astely et al. |
| 7,411,898 B2 | 8/2008 | Erlich et al. |
| 7,412,212 B2 | 8/2008 | Hottinen et al. |
| 7,418,043 B2 | 8/2008 | Shattil et al. |

(56) References Cited

U.S. PATENT DOCUMENTS

| | | |
|---|---|---|
| 7,418,246 B2 | 8/2008 | Kim et al. |
| 7,423,991 B2 | 9/2008 | Cho et al. |
| 7,426,426 B2 | 9/2008 | Van Baren et al. |
| 7,428,426 B2 * | 9/2008 | Kiran et al. .................. 455/522 |
| 7,433,661 B2 | 10/2008 | Kogiantis et al. |
| 7,437,164 B2 | 10/2008 | Agrawal et al. |
| 7,443,835 B2 | 10/2008 | Lakshmi Narayanan et al. |
| 7,447,270 B1 | 11/2008 | Hottinen et al. |
| 7,450,532 B2 | 11/2008 | Chae et al. |
| 7,450,548 B2 | 11/2008 | Haustein et al. |
| 7,460,466 B2 | 12/2008 | Lee et al. |
| 7,463,698 B2 | 12/2008 | Fujii et al. |
| 7,468,943 B2 | 12/2008 | Gu et al. |
| 7,469,011 B2 | 12/2008 | Lin et al. |
| 7,471,963 B2 | 12/2008 | Kim et al. |
| 7,483,408 B2 | 1/2009 | Bevan et al. |
| 7,483,719 B2 | 1/2009 | Kim et al. |
| 7,486,408 B2 | 2/2009 | Van Der Schaar et al. |
| 7,486,735 B2 | 2/2009 | Dubuc et al. |
| 7,492,788 B2 | 2/2009 | Zhang et al. |
| 7,499,393 B2 | 3/2009 | Ozluturk et al. |
| 7,508,748 B2 | 3/2009 | Kadous |
| 7,508,842 B2 | 3/2009 | Baum et al. |
| 7,512,096 B2 | 3/2009 | Kuzminskiy et al. |
| 7,545,867 B1 | 6/2009 | Lou et al. |
| 7,548,506 B2 | 6/2009 | Maa et al. |
| 7,551,546 B2 | 6/2009 | Ma et al. |
| 7,551,564 B2 | 6/2009 | Mattina |
| 7,558,293 B2 | 7/2009 | Choi et al. |
| 7,567,621 B2 | 7/2009 | Sampath et al. |
| 7,573,900 B2 | 8/2009 | Kim et al. |
| 7,599,327 B2 | 10/2009 | Zhuang |
| 7,616,955 B2 | 11/2009 | Kim et al. |
| 7,627,051 B2 | 12/2009 | Shen et al. |
| 7,664,061 B2 | 2/2010 | Hottinen |
| 7,676,007 B1 | 3/2010 | Choi et al. |
| 7,684,507 B2 | 3/2010 | Levy |
| 7,724,777 B2 | 5/2010 | Sutivong et al. |
| 7,768,979 B2 | 8/2010 | Sutivong et al. |
| 7,899,497 B2 | 3/2011 | Kish et al. |
| 7,916,624 B2 | 3/2011 | Laroia et al. |
| 7,924,699 B2 | 4/2011 | Laroia et al. |
| 7,990,843 B2 | 8/2011 | Laroia et al. |
| 7,990,844 B2 | 8/2011 | Laroia et al. |
| 8,014,271 B2 | 9/2011 | Laroia et al. |
| 8,045,512 B2 | 10/2011 | Khandekar et al. |
| 8,095,141 B2 | 1/2012 | Teague |
| 8,098,568 B2 | 1/2012 | Laroia et al. |
| 8,098,569 B2 | 1/2012 | Laroia et al. |
| 8,199,634 B2 | 6/2012 | Laroia et al. |
| 8,218,425 B2 | 7/2012 | Laroia et al. |
| 8,223,627 B2 | 7/2012 | Laroia et al. |
| 8,295,154 B2 | 10/2012 | Laroia et al. |
| 8,446,892 B2 | 5/2013 | Ji et al. |
| 8,462,859 B2 | 6/2013 | Sampath et al. |
| 8,582,509 B2 | 11/2013 | Khandekar et al. |
| 8,582,548 B2 | 11/2013 | Gore et al. |
| 8,879,511 B2 | 11/2014 | Agrawal et al. |
| 8,885,628 B2 | 11/2014 | Palanki et al. |
| 2001/0021650 A1 | 9/2001 | Bilgic et al. |
| 2001/0024427 A1 | 9/2001 | Suzuki |
| 2001/0030948 A1 | 10/2001 | Tiedemann, Jr. |
| 2001/0047424 A1 | 11/2001 | Alastalo et al. |
| 2001/0053140 A1 | 12/2001 | Choi et al. |
| 2001/0055294 A1 | 12/2001 | Motoyoshi |
| 2001/0055297 A1 | 12/2001 | Benveniste et al. |
| 2002/0000948 A1 | 1/2002 | Chun et al. |
| 2002/0015405 A1 | 2/2002 | Sepponen et al. |
| 2002/0018157 A1 | 2/2002 | Zhang et al. |
| 2002/0039912 A1 | 4/2002 | Yamaguchi et al. |
| 2002/0044524 A1 | 4/2002 | Laroia et al. |
| 2002/0058525 A1 | 5/2002 | Kasapi et al. |
| 2002/0061742 A1 | 5/2002 | Lapaille et al. |
| 2002/0077152 A1 | 6/2002 | Johnson et al. |
| 2002/0085521 A1 | 7/2002 | Tripathi et al. |
| 2002/0090004 A1 | 7/2002 | Rinchiuso |
| 2002/0090024 A1 | 7/2002 | Tan |
| 2002/0101839 A1 | 8/2002 | Farley et al. |
| 2002/0122381 A1 | 9/2002 | Wu et al. |
| 2002/0122403 A1 | 9/2002 | Hashem et al. |
| 2002/0128035 A1 | 9/2002 | Jokinen et al. |
| 2002/0147953 A1 | 10/2002 | Catreux et al. |
| 2002/0159422 A1 | 10/2002 | Li et al. |
| 2002/0160769 A1 | 10/2002 | Gray et al. |
| 2002/0160781 A1 | 10/2002 | Bark et al. |
| 2002/0168946 A1 | 11/2002 | Aizawa et al. |
| 2002/0172293 A1 | 11/2002 | Kuchi et al. |
| 2002/0176398 A1 | 11/2002 | Nidda |
| 2002/0181571 A1 | 12/2002 | Yamano et al. |
| 2002/0193146 A1 | 12/2002 | Wallace et al. |
| 2003/0002464 A1 | 1/2003 | Rezaiifar et al. |
| 2003/0020651 A1 | 1/2003 | Crilly, Jr. et al. |
| 2003/0027579 A1 | 2/2003 | Sydon |
| 2003/0035491 A1 | 2/2003 | Walton et al. |
| 2003/0036359 A1 | 2/2003 | Dent et al. |
| 2003/0040283 A1 | 2/2003 | Kawai et al. |
| 2003/0043732 A1 | 3/2003 | Walton et al. |
| 2003/0043764 A1 | 3/2003 | Kim et al. |
| 2003/0063579 A1 | 4/2003 | Lee |
| 2003/0068983 A1 | 4/2003 | Kim et al. |
| 2003/0072254 A1 | 4/2003 | Ma et al. |
| 2003/0072255 A1 | 4/2003 | Ma et al. |
| 2003/0072280 A1 | 4/2003 | McFarland et al. |
| 2003/0072395 A1 | 4/2003 | Jia et al. |
| 2003/0073409 A1 | 4/2003 | Nobukiyo et al. |
| 2003/0073464 A1 | 4/2003 | Giannakis et al. |
| 2003/0076890 A1 | 4/2003 | Hochwald et al. |
| 2003/0086371 A1 | 5/2003 | Walton et al. |
| 2003/0086393 A1 | 5/2003 | Vasudevan et al. |
| 2003/0096579 A1 * | 5/2003 | Ito et al. ...................... 455/67.1 |
| 2003/0103520 A1 | 6/2003 | Chen et al. |
| 2003/0109266 A1 | 6/2003 | Rafiah et al. |
| 2003/0112745 A1 | 6/2003 | Zhuang et al. |
| 2003/0123414 A1 | 7/2003 | Tong et al. |
| 2003/0125040 A1 | 7/2003 | Walton et al. |
| 2003/0128658 A1 | 7/2003 | Walton et al. |
| 2003/0133426 A1 | 7/2003 | Schein et al. |
| 2003/0142648 A1 | 7/2003 | Semper |
| 2003/0142729 A1 | 7/2003 | Subrahmanya et al. |
| 2003/0147371 A1 | 8/2003 | Choi et al. |
| 2003/0161281 A1 | 8/2003 | Dulin et al. |
| 2003/0161282 A1 | 8/2003 | Medvedev et al. |
| 2003/0165189 A1 | 9/2003 | Kadous et al. |
| 2003/0181170 A1 | 9/2003 | Sim |
| 2003/0185310 A1 | 10/2003 | Ketchum et al. |
| 2003/0190897 A1 | 10/2003 | Lei et al. |
| 2003/0193915 A1 | 10/2003 | Lee et al. |
| 2003/0202491 A1 | 10/2003 | Tiedemann, Jr. et al. |
| 2003/0202560 A1 | 10/2003 | Tiedemann, Jr. et al. |
| 2003/0216156 A1 | 11/2003 | Chun et al. |
| 2003/0228850 A1 | 12/2003 | Hwang |
| 2003/0235255 A1 | 12/2003 | Ketchum et al. |
| 2004/0001429 A1 | 1/2004 | Ma et al. |
| 2004/0001460 A1 | 1/2004 | Bevan et al. |
| 2004/0002364 A1 | 1/2004 | Trikkonen et al. |
| 2004/0009783 A1 | 1/2004 | Miyoshi et al. |
| 2004/0010623 A1 | 1/2004 | Sher et al. |
| 2004/0015692 A1 | 1/2004 | Green et al. |
| 2004/0017785 A1 | 1/2004 | Zelst et al. |
| 2004/0032443 A1 | 2/2004 | Moylan et al. |
| 2004/0042558 A1 | 3/2004 | Hwang et al. |
| 2004/0048609 A1 | 3/2004 | Kosaka |
| 2004/0048630 A1 | 3/2004 | Shapira et al. |
| 2004/0054999 A1 | 3/2004 | Willen et al. |
| 2004/0057394 A1 | 3/2004 | Holtzman et al. |
| 2004/0058687 A1 | 3/2004 | Kim et al. |
| 2004/0066754 A1 | 4/2004 | Hottinen et al. |
| 2004/0066761 A1 | 4/2004 | Giannakis et al. |
| 2004/0066772 A1 | 4/2004 | Moon et al. |
| 2004/0067756 A1 | 4/2004 | Wager et al. |
| 2004/0072565 A1 | 4/2004 | Nobukiyo et al. |
| 2004/0076185 A1 | 4/2004 | Kim et al. |
| 2004/0077345 A1 | 4/2004 | Turner et al. |
| 2004/0077379 A1 | 4/2004 | Smith et al. |

(56) References Cited

U.S. PATENT DOCUMENTS

| | | |
|---|---|---|
| 2004/0081073 A1 | 4/2004 | Walton et al. |
| 2004/0081195 A1 | 4/2004 | El-Maleh et al. |
| 2004/0087325 A1 | 5/2004 | Cheng et al. |
| 2004/0095907 A1 | 5/2004 | Agee et al. |
| 2004/0097215 A1 | 5/2004 | Abe et al. |
| 2004/0097240 A1 | 5/2004 | Chen et al. |
| 2004/0098505 A1 | 5/2004 | Clemmensen et al. |
| 2004/0105489 A1 | 6/2004 | Kim et al. |
| 2004/0114618 A1 | 6/2004 | Tong et al. |
| 2004/0120411 A1 | 6/2004 | Walton et al. |
| 2004/0125792 A1 | 7/2004 | Bradbury et al. |
| 2004/0128605 A1 | 7/2004 | Sibecas et al. |
| 2004/0131007 A1 | 7/2004 | Smee et al. |
| 2004/0131008 A1 | 7/2004 | Zuniga et al. |
| 2004/0131038 A1 | 7/2004 | Kim et al. |
| 2004/0131110 A1 | 7/2004 | Alard et al. |
| 2004/0136344 A1 | 7/2004 | Kim et al. |
| 2004/0136349 A1 | 7/2004 | Walton et al. |
| 2004/0156328 A1 | 8/2004 | Walton et al. |
| 2004/0160914 A1 | 8/2004 | Sarkar et al. |
| 2004/0160933 A1 | 8/2004 | Odenwalder et al. |
| 2004/0162083 A1 | 8/2004 | Chen et al. |
| 2004/0165564 A1 | 8/2004 | Kim et al. |
| 2004/0166867 A1 | 8/2004 | Hawe et al. |
| 2004/0166887 A1 | 8/2004 | Laroia et al. |
| 2004/0170152 A1 | 9/2004 | Nagao et al. |
| 2004/0170157 A1 | 9/2004 | Kim et al. |
| 2004/0171384 A1 | 9/2004 | Holma et al. |
| 2004/0171385 A1 | 9/2004 | Haustein et al. |
| 2004/0178954 A1 | 9/2004 | Vook et al. |
| 2004/0179480 A1 | 9/2004 | Attar et al. |
| 2004/0179494 A1 | 9/2004 | Attar et al. |
| 2004/0179506 A1 | 9/2004 | Padovani et al. |
| 2004/0179627 A1 | 9/2004 | Ketchum et al. |
| 2004/0181569 A1 | 9/2004 | Attar et al. |
| 2004/0185792 A1 | 9/2004 | Alexiou et al. |
| 2004/0190640 A1 | 9/2004 | Dubuc et al. |
| 2004/0202257 A1 | 10/2004 | Mehta et al. |
| 2004/0208138 A1 | 10/2004 | Hayashi et al. |
| 2004/0218520 A1 | 11/2004 | Aizawa et al. |
| 2004/0219819 A1 | 11/2004 | Di Mascio et al. |
| 2004/0219919 A1 | 11/2004 | Whinnett et al. |
| 2004/0224711 A1 | 11/2004 | Panchal et al. |
| 2004/0228267 A1 | 11/2004 | Agrawal et al. |
| 2004/0228313 A1 | 11/2004 | Cheng et al. |
| 2004/0229615 A1 | 11/2004 | Agrawal et al. |
| 2004/0240419 A1 | 12/2004 | Abrishamkar et al. |
| 2004/0240572 A1 | 12/2004 | Brutel et al. |
| 2004/0248604 A1 | 12/2004 | Vaidyanathan et al. |
| 2004/0252529 A1 | 12/2004 | Huber et al. |
| 2004/0252629 A1 | 12/2004 | Hasegawa et al. |
| 2004/0252655 A1 | 12/2004 | Lim et al. |
| 2004/0252662 A1 | 12/2004 | Cho |
| 2004/0257979 A1 | 12/2004 | Ro et al. |
| 2004/0264507 A1 | 12/2004 | Cho et al. |
| 2004/0264585 A1 | 12/2004 | Borran et al. |
| 2004/0264593 A1 | 12/2004 | Shim et al. |
| 2005/0002412 A1 | 1/2005 | Sagfors et al. |
| 2005/0002440 A1 | 1/2005 | Alamouti et al. |
| 2005/0002467 A1 | 1/2005 | Seo et al. |
| 2005/0002468 A1 | 1/2005 | Walton et al. |
| 2005/0003782 A1 | 1/2005 | Wintzell |
| 2005/0008091 A1 | 1/2005 | Boutros et al. |
| 2005/0009486 A1 | 1/2005 | Al-Dhahir et al. |
| 2005/0013263 A1 | 1/2005 | Kim et al. |
| 2005/0025093 A1 | 2/2005 | Yun et al. |
| 2005/0030886 A1 | 2/2005 | Wu et al. |
| 2005/0030964 A1 | 2/2005 | Tiedemann, Jr. et al. |
| 2005/0034079 A1 | 2/2005 | Gunasekar et al. |
| 2005/0041611 A1 | 2/2005 | Sandhu et al. |
| 2005/0041618 A1 | 2/2005 | Wei et al. |
| 2005/0041750 A1 | 2/2005 | Lau et al. |
| 2005/0041775 A1 | 2/2005 | Batzinger et al. |
| 2005/0044206 A1 | 2/2005 | Johansson et al. |
| 2005/0047517 A1 | 3/2005 | Georgios et al. |
| 2005/0052991 A1 | 3/2005 | Kadous |
| 2005/0053081 A1 | 3/2005 | Andersson et al. |
| 2005/0053151 A1 | 3/2005 | Lin et al. |
| 2005/0063298 A1 | 3/2005 | Ling et al. |
| 2005/0068921 A1 | 3/2005 | Liu |
| 2005/0073976 A1 | 4/2005 | Fujii |
| 2005/0084000 A1 | 4/2005 | Krauss et al. |
| 2005/0085195 A1 | 4/2005 | Tong et al. |
| 2005/0085236 A1 | 4/2005 | Gerlach et al. |
| 2005/0111397 A1 | 5/2005 | Attar et al. |
| 2005/0113100 A1 | 5/2005 | Oprescu-Surcobe et al. |
| 2005/0122898 A1 | 6/2005 | Jang et al. |
| 2005/0128683 A1 | 6/2005 | Watanabe et al. |
| 2005/0128983 A1 | 6/2005 | Kim et al. |
| 2005/0135324 A1 | 6/2005 | Kim et al. |
| 2005/0135498 A1 | 6/2005 | Yee |
| 2005/0141624 A1 | 6/2005 | Lakshmipathi et al. |
| 2005/0147024 A1 | 7/2005 | Jung et al. |
| 2005/0147025 A1 | 7/2005 | Auer et al. |
| 2005/0152484 A1 | 7/2005 | Sandhu et al. |
| 2005/0157807 A1 | 7/2005 | Shim et al. |
| 2005/0159162 A1 | 7/2005 | Park |
| 2005/0164709 A1 | 7/2005 | Balasubramanian et al. |
| 2005/0165949 A1 | 7/2005 | Teague |
| 2005/0174981 A1 | 8/2005 | Heath, Jr. et al. |
| 2005/0175070 A1 | 8/2005 | Grob et al. |
| 2005/0180311 A1 | 8/2005 | Wang et al. |
| 2005/0180313 A1 | 8/2005 | Kim et al. |
| 2005/0181799 A1 | 8/2005 | Laroia et al. |
| 2005/0192011 A1 | 9/2005 | Hong et al. |
| 2005/0195852 A1 | 9/2005 | Vayanos et al. |
| 2005/0195886 A1 | 9/2005 | Lampinen et al. |
| 2005/0201296 A1 | 9/2005 | Vannithamby et al. |
| 2005/0204247 A1 | 9/2005 | Guo et al. |
| 2005/0207367 A1 | 9/2005 | Onggosanusi et al. |
| 2005/0215196 A1 | 9/2005 | Krishnan et al. |
| 2005/0215251 A1 | 9/2005 | Krishnan et al. |
| 2005/0226204 A1 | 10/2005 | Uehara et al. |
| 2005/0239465 A1 | 10/2005 | Lee et al. |
| 2005/0243791 A1 | 11/2005 | Park et al. |
| 2005/0246548 A1 | 11/2005 | Laitinen et al. |
| 2005/0249266 A1 | 11/2005 | Brown et al. |
| 2005/0254416 A1 | 11/2005 | Laroia et al. |
| 2005/0254467 A1 | 11/2005 | Li et al. |
| 2005/0254477 A1 | 11/2005 | Lee et al. |
| 2005/0254556 A1 | 11/2005 | Fujii et al. |
| 2005/0259005 A1 | 11/2005 | Chiang et al. |
| 2005/0259723 A1 | 11/2005 | Blanchard et al. |
| 2005/0259757 A1 | 11/2005 | Wu et al. |
| 2005/0265220 A1 | 12/2005 | Erlich et al. |
| 2005/0265293 A1 | 12/2005 | Ro et al. |
| 2005/0265470 A1 | 12/2005 | Kishigami et al. |
| 2005/0271012 A1 | 12/2005 | Agrawal et al. |
| 2005/0276347 A1 | 12/2005 | Mujtaba et al. |
| 2005/0276348 A1 | 12/2005 | Vandenameele |
| 2005/0277423 A1 | 12/2005 | Sandhu et al. |
| 2005/0281029 A1 | 12/2005 | Inamoto et al. |
| 2005/0281290 A1 | 12/2005 | Khandekar et al. |
| 2005/0282500 A1 | 12/2005 | Wang et al. |
| 2005/0286408 A1 | 12/2005 | Jin et al. |
| 2005/0289256 A1 | 12/2005 | Cudak et al. |
| 2006/0002451 A1 | 1/2006 | Fukuta et al. |
| 2006/0013285 A1 | 1/2006 | Kobayashi et al. |
| 2006/0018336 A1 | 1/2006 | Sutivong et al. |
| 2006/0018347 A1 | 1/2006 | Agrawal |
| 2006/0018397 A1 | 1/2006 | Sampath et al. |
| 2006/0026344 A1 | 2/2006 | Sun Hsu et al. |
| 2006/0029289 A1 | 2/2006 | Yamaguchi et al. |
| 2006/0034164 A1* | 2/2006 | Ozluturk ................... 370/208 |
| 2006/0034173 A1 | 2/2006 | Teague et al. |
| 2006/0039332 A1 | 2/2006 | Kotzin |
| 2006/0039344 A1 | 2/2006 | Khan et al. |
| 2006/0039500 A1 | 2/2006 | Yun et al. |
| 2006/0040655 A1 | 2/2006 | Kim et al. |
| 2006/0045003 A1 | 3/2006 | Choi et al. |
| 2006/0050770 A1 | 3/2006 | Wallace et al. |
| 2006/0056340 A1 | 3/2006 | Hottinen et al. |
| 2006/0057958 A1 | 3/2006 | Ngo et al. |
| 2006/0067421 A1 | 3/2006 | Walton et al. |

(56) References Cited

U.S. PATENT DOCUMENTS

| | | |
|---|---|---|
| 2006/0078075 A1 | 4/2006 | Stamoulis et al. |
| 2006/0083159 A1 | 4/2006 | Laroia et al. |
| 2006/0083183 A1 | 4/2006 | Teague et al. |
| 2006/0089104 A1 | 4/2006 | Kaikkonen et al. |
| 2006/0092054 A1 | 5/2006 | Li et al. |
| 2006/0093065 A1 | 5/2006 | Thomas et al. |
| 2006/0104333 A1 | 5/2006 | Rainbolt et al. |
| 2006/0104381 A1 | 5/2006 | Menon et al. |
| 2006/0107171 A1 | 5/2006 | Skraparlis |
| 2006/0109814 A1 | 5/2006 | Kuzminskiy et al. |
| 2006/0111054 A1 | 5/2006 | Pan et al. |
| 2006/0111148 A1 | 5/2006 | Mukkavilli et al. |
| 2006/0114858 A1 | 6/2006 | Walton et al. |
| 2006/0120469 A1 | 6/2006 | Maltsev et al. |
| 2006/0120471 A1 | 6/2006 | Learned et al. |
| 2006/0126491 A1 | 6/2006 | Ro et al. |
| 2006/0133269 A1 | 6/2006 | Prakash et al. |
| 2006/0133455 A1 | 6/2006 | Agrawal et al. |
| 2006/0133521 A1 | 6/2006 | Sampath et al. |
| 2006/0140289 A1 | 6/2006 | Mandyam et al. |
| 2006/0153239 A1 | 7/2006 | Julian et al. |
| 2006/0155534 A1 | 7/2006 | Lin et al. |
| 2006/0156199 A1 | 7/2006 | Palanki et al. |
| 2006/0172704 A1 | 8/2006 | Nishio et al. |
| 2006/0189321 A1 | 8/2006 | Oh et al. |
| 2006/0193294 A1 | 8/2006 | Jorswieck et al. |
| 2006/0203708 A1 | 9/2006 | Sampath et al. |
| 2006/0203794 A1 | 9/2006 | Sampath et al. |
| 2006/0203891 A1 | 9/2006 | Sampath et al. |
| 2006/0203932 A1 | 9/2006 | Palanki et al. |
| 2006/0209670 A1 | 9/2006 | Gorokhov et al. |
| 2006/0209732 A1 | 9/2006 | Gorokhov et al. |
| 2006/0209754 A1 | 9/2006 | Ji et al. |
| 2006/0209764 A1 | 9/2006 | Kim et al. |
| 2006/0209973 A1 | 9/2006 | Gorokhov et al. |
| 2006/0215777 A1 | 9/2006 | Krishnamoorthi |
| 2006/0218459 A1 | 9/2006 | Hedberg |
| 2006/0223449 A1 | 10/2006 | Sampath et al. |
| 2006/0233124 A1 | 10/2006 | Palanki et al. |
| 2006/0233131 A1 | 10/2006 | Gore et al. |
| 2006/0233222 A1 | 10/2006 | Reial et al. |
| 2006/0262754 A1 | 11/2006 | Andersson et al. |
| 2006/0270427 A1 | 11/2006 | Shida et al. |
| 2006/0274836 A1 | 12/2006 | Sampath et al. |
| 2006/0280114 A1 | 12/2006 | Osseiran et al. |
| 2006/0285485 A1 | 12/2006 | Agrawal et al. |
| 2006/0285515 A1 | 12/2006 | Julian et al. |
| 2006/0286974 A1 | 12/2006 | Gore et al. |
| 2006/0286982 A1 | 12/2006 | Prakash et al. |
| 2006/0286995 A1 | 12/2006 | Onggosanusi et al. |
| 2006/0291371 A1 | 12/2006 | Sutivong et al. |
| 2006/0292989 A1 | 12/2006 | Gerlach et al. |
| 2007/0004430 A1 | 1/2007 | Hyun et al. |
| 2007/0005749 A1 | 1/2007 | Sampath |
| 2007/0009011 A1 | 1/2007 | Coulson et al. |
| 2007/0019596 A1 | 1/2007 | Barriac et al. |
| 2007/0025345 A1 | 2/2007 | Bachl et al. |
| 2007/0041311 A1 | 2/2007 | Baum et al. |
| 2007/0041404 A1 | 2/2007 | Palanki et al. |
| 2007/0041457 A1 | 2/2007 | Kadous et al. |
| 2007/0047485 A1 | 3/2007 | Gorokhov et al. |
| 2007/0047495 A1 | 3/2007 | Ji et al. |
| 2007/0049218 A1 | 3/2007 | Gorokhov et al. |
| 2007/0053282 A1 | 3/2007 | Tong et al. |
| 2007/0053383 A1 | 3/2007 | Choi et al. |
| 2007/0060178 A1 | 3/2007 | Gorokhov et al. |
| 2007/0064669 A1 | 3/2007 | Classon et al. |
| 2007/0070952 A1 | 3/2007 | Yoon et al. |
| 2007/0071147 A1 | 3/2007 | Sampath et al. |
| 2007/0097853 A1 | 5/2007 | Khandekar et al. |
| 2007/0097889 A1 | 5/2007 | Wang et al. |
| 2007/0097897 A1 | 5/2007 | Teague et al. |
| 2007/0097908 A1 | 5/2007 | Khandekar et al. |
| 2007/0097909 A1 | 5/2007 | Khandekar et al. |
| 2007/0097910 A1 | 5/2007 | Ji et al. |
| 2007/0097922 A1 | 5/2007 | Parekh et al. |
| 2007/0097927 A1 | 5/2007 | Gorokhov et al. |
| 2007/0097942 A1 | 5/2007 | Gorokhov et al. |
| 2007/0097981 A1 | 5/2007 | Papasakellariou et al. |
| 2007/0098050 A1 | 5/2007 | Khandekar et al. |
| 2007/0098120 A1 | 5/2007 | Wang |
| 2007/0099666 A1 | 5/2007 | Astely et al. |
| 2007/0110172 A1 | 5/2007 | Faulkner et al. |
| 2007/0115795 A1 | 5/2007 | Gore et al. |
| 2007/0149194 A1 | 6/2007 | Das et al. |
| 2007/0149228 A1 | 6/2007 | Das |
| 2007/0159969 A1 | 7/2007 | Das et al. |
| 2007/0160115 A1 | 7/2007 | Palanki et al. |
| 2007/0165738 A1 | 7/2007 | Barriac et al. |
| 2007/0177631 A1 | 8/2007 | Popovic et al. |
| 2007/0177681 A1 | 8/2007 | Choi et al. |
| 2007/0183303 A1 | 8/2007 | Pi et al. |
| 2007/0183386 A1 | 8/2007 | Muharemovic et al. |
| 2007/0207812 A1 | 9/2007 | Borran et al. |
| 2007/0211616 A1 | 9/2007 | Khandekar et al. |
| 2007/0211667 A1 | 9/2007 | Agrawal et al. |
| 2007/0230324 A1 | 10/2007 | Li et al. |
| 2007/0242653 A1 | 10/2007 | Yang et al. |
| 2007/0263743 A1 | 11/2007 | Lee et al. |
| 2007/0280336 A1 | 12/2007 | Zhangg et al. |
| 2007/0281702 A1 | 12/2007 | Lim et al. |
| 2008/0039129 A1 | 2/2008 | Li et al. |
| 2008/0063099 A1 | 3/2008 | Laroia et al. |
| 2008/0095223 A1 | 4/2008 | Tong et al. |
| 2008/0095262 A1 | 4/2008 | Hoo et al. |
| 2008/0151829 A1 | 6/2008 | Khandekar et al. |
| 2008/0181139 A1 | 7/2008 | Rangarajan et al. |
| 2008/0214222 A1 | 9/2008 | Atarashi et al. |
| 2008/0253279 A1 | 10/2008 | Ma et al. |
| 2008/0267157 A1 | 10/2008 | Leee et al. |
| 2008/0299983 A1 | 12/2008 | Kwak et al. |
| 2009/0003466 A1 | 1/2009 | Taherzadehboroujeni et al. |
| 2009/0010351 A1 | 1/2009 | Laroia et al. |
| 2009/0022098 A1 | 1/2009 | Novak et al. |
| 2009/0041150 A1 | 2/2009 | Tsai et al. |
| 2009/0110103 A1 | 4/2009 | Maltsev et al. |
| 2009/0129501 A1 | 5/2009 | Mehta et al. |
| 2009/0180459 A1 | 7/2009 | Orlikk et al. |
| 2009/0197646 A1 | 8/2009 | Tamura et al. |
| 2009/0201826 A1 | 8/2009 | Gorokhov et al. |
| 2009/0201872 A1 | 8/2009 | Gorokhov et al. |
| 2009/0213750 A1 | 8/2009 | Gorokhov et al. |
| 2009/0213950 A1 | 8/2009 | Gorokhov et al. |
| 2009/0262641 A1 | 10/2009 | Laroia et al. |
| 2009/0262699 A1 | 10/2009 | Wengerterr et al. |
| 2009/0285163 A1 | 11/2009 | Zhang et al. |
| 2009/0287977 A1 | 11/2009 | Chang et al. |
| 2010/0002570 A9 | 1/2010 | Walton et al. |
| 2010/0135242 A1 | 6/2010 | Nam et al. |
| 2010/0220800 A1 | 9/2010 | Erell et al. |
| 2010/0232384 A1 | 9/2010 | Farajidana et al. |
| 2010/0238902 A1 | 9/2010 | Ji et al. |
| 2010/0254263 A1 | 10/2010 | Chen et al. |
| 2011/0064070 A1 | 3/2011 | Gore et al. |
| 2011/0235733 A1 | 9/2011 | Laroia et al. |
| 2011/0235745 A1 | 9/2011 | Laroia et al. |
| 2011/0235746 A1 | 9/2011 | Laroia et al. |
| 2011/0235747 A1 | 9/2011 | Laroia et al. |
| 2011/0255518 A9 | 10/2011 | Agrawal et al. |
| 2011/0306291 A1 | 12/2011 | Ma et al. |
| 2012/0002623 A1 | 1/2012 | Khandekar et al. |
| 2012/0063441 A1 | 3/2012 | Palanki |
| 2012/0120925 A1 | 5/2012 | Kadous et al. |
| 2012/0140798 A1 | 6/2012 | Kadous et al. |
| 2012/0140838 A1 | 6/2012 | Kadous et al. |
| 2013/0016678 A1 | 1/2013 | Laroia et al. |
| 2013/0208681 A1 | 8/2013 | Gore et al. |
| 2013/0287138 A1 | 10/2013 | Ma et al. |

(56) References Cited

U.S. PATENT DOCUMENTS

| | | | |
|---|---|---|---|
| 2013/0315200 A1 | 11/2013 | Gorokhov et al. | |
| 2014/0247898 A1 | 9/2014 | Laroia et al. | |
| 2014/0376518 A1 | 12/2014 | Palanki et al. | |

FOREIGN PATENT DOCUMENTS

| | | | |
|---|---|---|---|
| CA | 2477536 | | 9/2003 |
| CA | 2540688 | | 5/2005 |
| CA | 2577369 | | 3/2006 |
| CL | 14001993 | | 12/1994 |
| CL | 8461997 | | 1/1998 |
| CL | 9531997 | | 1/1998 |
| CL | 27102004 | | 8/2005 |
| CL | 22892004 | | 9/2005 |
| CL | 30862004 | | 10/2005 |
| CL | 29932005 | | 5/2006 |
| CL | 29012006 | | 10/2006 |
| CL | 29022006 | | 10/2006 |
| CL | 29032006 | | 10/2006 |
| CL | 29042006 | | 10/2006 |
| CL | 29062006 | | 10/2006 |
| CL | 29082006 | | 10/2006 |
| CL | 15202006 | | 12/2006 |
| CL | 22032006 | | 2/2007 |
| CL | 15212006 | | 3/2007 |
| CL | 14922006 | | 4/2007 |
| CL | 14892006 | | 5/2007 |
| CL | 14902006 | | 5/2007 |
| CL | 46151 | | 12/2009 |
| CL | 29072006 | | 1/2010 |
| CN | 1252919 | | 5/2000 |
| CN | 1267437 | | 9/2000 |
| CN | 1284795 | | 2/2001 |
| CN | 1296682 | | 5/2001 |
| CN | 1344451 | | 4/2002 |
| CN | 1346221 | | 4/2002 |
| CN | 1383631 | | 12/2002 |
| CN | 1386344 | | 12/2002 |
| CN | 1402916 | A | 3/2003 |
| CN | 1424835 | | 6/2003 |
| CN | 1132474 | C | 12/2003 |
| CN | 1467938 | A | 1/2004 |
| CN | 1487755 | A | 4/2004 |
| CN | 1520220 | | 8/2004 |
| CN | 1525678 | | 9/2004 |
| CN | 1636346 | | 7/2005 |
| CN | 1642051 | A | 7/2005 |
| CN | 1642335 | A | 7/2005 |
| CN | 1647436 | | 7/2005 |
| DE | 19800653 | A1 | 7/1999 |
| DE | 19800953 | | 7/1999 |
| DE | 19957288 | | 5/2001 |
| DE | 10240138 | | 8/2003 |
| DE | 10254384 | | 6/2004 |
| EP | 0488976 | | 6/1992 |
| EP | 0568291 | A2 | 11/1993 |
| EP | 0740431 | A1 | 10/1996 |
| EP | 0786889 | A1 | 7/1997 |
| EP | 0805576 | A2 | 11/1997 |
| EP | 0807989 | A1 | 11/1997 |
| EP | 0844796 | | 5/1998 |
| EP | 0981222 | A2 | 2/2000 |
| EP | 1001570 | A2 | 5/2000 |
| EP | 1047209 | A1 | 10/2000 |
| EP | 1061687 | | 12/2000 |
| EP | 1091516 | A1 | 4/2001 |
| EP | 1093241 | A1 | 4/2001 |
| EP | 1148673 | A2 | 10/2001 |
| EP | 1172983 | A2 | 1/2002 |
| EP | 1180907 | A2 | 2/2002 |
| EP | 1187506 | A1 | 3/2002 |
| EP | 1204217 | | 5/2002 |
| EP | 1255369 | | 11/2002 |
| EP | 1267513 | | 12/2002 |
| EP | 1074099 | B1 | 2/2003 |
| EP | 1286490 | | 2/2003 |
| EP | 1335504 | A2 | 8/2003 |
| EP | 1351538 | A1 | 10/2003 |
| EP | 1376920 | | 1/2004 |
| EP | 1392073 | A1 | 2/2004 |
| EP | 1434365 | A2 | 6/2004 |
| EP | 1441469 | A2 | 7/2004 |
| EP | 1445873 | A2 | 8/2004 |
| EP | 1465449 | A1 | 10/2004 |
| EP | 1478204 | A2 | 11/2004 |
| EP | 1507421 | | 2/2005 |
| EP | 1513356 | A2 | 3/2005 |
| EP | 1531575 | A2 | 5/2005 |
| EP | 1533950 | | 5/2005 |
| EP | 1538863 | | 6/2005 |
| EP | 1542488 | A1 | 6/2005 |
| EP | 1601149 | A2 | 11/2005 |
| EP | 1643669 | A1 | 4/2006 |
| EP | 1898542 | A1 | 3/2008 |
| EP | 1941693 | | 7/2011 |
| FR | 2584884 | | 1/1987 |
| GB | 2279540 | A | 1/1995 |
| GB | 2348776 | | 10/2000 |
| GB | 2412541 | A | 9/2005 |
| IL | 167573 | | 2/2011 |
| IL | 201872 | | 5/2012 |
| JP | H04111544 | A | 4/1992 |
| JP | 4301931 | A | 10/1992 |
| JP | H0746248 | A | 2/1995 |
| JP | 7336323 | A | 12/1995 |
| JP | 8116329 | A | 5/1996 |
| JP | 08288927 | | 11/1996 |
| JP | 9008725 | | 1/1997 |
| JP | H09501548 | A | 2/1997 |
| JP | 9131342 | | 5/1997 |
| JP | 9182148 | A | 7/1997 |
| JP | 09214404 | | 8/1997 |
| JP | 9284200 | A | 10/1997 |
| JP | 10117162 | | 5/1998 |
| JP | H10210000 | A | 8/1998 |
| JP | 10322304 | | 12/1998 |
| JP | H11168453 | A | 6/1999 |
| JP | 11191756 | A | 7/1999 |
| JP | 11196109 | | 7/1999 |
| JP | 11508417 | T | 7/1999 |
| JP | 11239155 | A | 8/1999 |
| JP | 11298954 | | 10/1999 |
| JP | 11331927 | A | 11/1999 |
| JP | 2000022618 | A | 1/2000 |
| JP | 2000102065 | A | 4/2000 |
| JP | 2000184425 | | 6/2000 |
| JP | 2000511750 | A | 9/2000 |
| JP | 2000332724 | A | 11/2000 |
| JP | 2001016644 | A2 | 1/2001 |
| JP | 2001045573 | A | 2/2001 |
| JP | 2001057545 | A | 2/2001 |
| JP | 2001156732 | A | 6/2001 |
| JP | 2001238269 | | 8/2001 |
| JP | 2001245355 | A | 9/2001 |
| JP | 2001249802 | | 9/2001 |
| JP | 2001285927 | A | 10/2001 |
| JP | 2001521698 | A | 11/2001 |
| JP | 2001526012 | | 12/2001 |
| JP | 2002026790 | | 1/2002 |
| JP | 2002111556 | A | 4/2002 |
| JP | 2002515203 | T | 5/2002 |
| JP | 2002290148 | A | 10/2002 |
| JP | 2002534925 | A | 10/2002 |
| JP | 2002534941 | | 10/2002 |
| JP | 2002538696 | A | 11/2002 |
| JP | 200318054 | | 1/2003 |
| JP | 2003032218 | | 1/2003 |
| JP | 2003500909 | | 1/2003 |
| JP | 200369472 | | 3/2003 |
| JP | 2003101515 | | 4/2003 |
| JP | 2003169367 | A | 6/2003 |
| JP | 2003174426 | | 6/2003 |
| JP | 2003199173 | A | 7/2003 |

(56) References Cited

FOREIGN PATENT DOCUMENTS

| | | |
|---|---|---|
| JP | 2003520523 | 7/2003 |
| JP | 2003235072 A | 8/2003 |
| JP | 2003249907 A | 9/2003 |
| JP | 2003292667 A | 10/2003 |
| JP | 2003318857 A | 11/2003 |
| JP | 2003347985 | 12/2003 |
| JP | 2003348047 | 12/2003 |
| JP | 2003536308 A | 12/2003 |
| JP | 2004007643 A | 1/2004 |
| JP | 2004023716 | 1/2004 |
| JP | 2004048716 | 2/2004 |
| JP | 200472457 | 3/2004 |
| JP | 2004072157 A | 3/2004 |
| JP | 2004096142 | 3/2004 |
| JP | 2004507151 A | 3/2004 |
| JP | 2004507950 A | 3/2004 |
| JP | 2004153676 | 5/2004 |
| JP | 2004158901 A | 6/2004 |
| JP | 2004162388 A | 6/2004 |
| JP | 2004194262 A | 7/2004 |
| JP | 2004201296 A | 7/2004 |
| JP | 2004215022 A | 7/2004 |
| JP | 2004221972 | 8/2004 |
| JP | 2004266818 | 9/2004 |
| JP | 2004529524 T | 9/2004 |
| JP | 2004297276 A | 10/2004 |
| JP | 2004297370 A | 10/2004 |
| JP | 2004297756 | 10/2004 |
| JP | 2004534456 | 11/2004 |
| JP | 2004535106 A | 11/2004 |
| JP | 2005006337 | 1/2005 |
| JP | 2005020530 A | 1/2005 |
| JP | 2005502218 T | 1/2005 |
| JP | 2005506757 | 3/2005 |
| JP | 2005110130 A | 4/2005 |
| JP | 2005130491 A | 5/2005 |
| JP | 2005167502 A | 6/2005 |
| JP | 2005197772 | 7/2005 |
| JP | 2005203961 | 7/2005 |
| JP | 2005521327 | 7/2005 |
| JP | 2005521358 | 7/2005 |
| JP | 2005236678 A | 9/2005 |
| JP | 2006505172 | 2/2006 |
| JP | 2006506860 A | 2/2006 |
| JP | 2006211537 A | 8/2006 |
| JP | 2006524930 A | 11/2006 |
| JP | 2007503790 | 2/2007 |
| JP | 2007519281 | 7/2007 |
| JP | 2007520309 A | 7/2007 |
| JP | 2007525043 T | 8/2007 |
| JP | 2007527127 | 9/2007 |
| JP | 2008505587 A | 2/2008 |
| JP | 2008535398 | 8/2008 |
| JP | 4188372 B2 | 11/2008 |
| JP | 2008546314 | 12/2008 |
| JP | 04694628 B2 | 6/2011 |
| KR | 0150275 B1 | 6/1998 |
| KR | 20000060428 | 10/2000 |
| KR | 100291476 B1 | 3/2001 |
| KR | 20010056333 | 4/2001 |
| KR | 20010087715 A | 9/2001 |
| KR | 20030007965 | 1/2003 |
| KR | 20030035969 A | 5/2003 |
| KR | 20040063057 | 7/2004 |
| KR | 200471652 | 8/2004 |
| KR | 20040103441 A | 12/2004 |
| KR | 20050061559 | 6/2005 |
| KR | 20050063826 A | 6/2005 |
| KR | 100606099 | 7/2006 |
| RU | 95121152 | 12/1997 |
| RU | 2141168 C1 | 11/1999 |
| RU | 2141706 C1 | 11/1999 |
| RU | 2159007 C2 | 11/2000 |
| RU | 2162275 C2 | 1/2001 |
| RU | 2183387 C2 | 6/2002 |
| RU | 2192094 C1 | 10/2002 |
| RU | 2197778 C2 | 1/2003 |
| RU | 2201033 C2 | 3/2003 |
| RU | 2207723 C1 | 6/2003 |
| RU | 2208913 | 7/2003 |
| RU | 2210866 C2 | 8/2003 |
| RU | 2216101 C2 | 11/2003 |
| RU | 2216103 C2 | 11/2003 |
| RU | 2216105 C2 | 11/2003 |
| RU | 2225080 C2 | 2/2004 |
| RU | 2235429 | 8/2004 |
| RU | 2235432 C2 | 8/2004 |
| RU | 2237379 C2 | 9/2004 |
| RU | 2238611 | 10/2004 |
| RU | 2242091 C2 | 12/2004 |
| RU | 2003125268 | 2/2005 |
| RU | 2285388 | 3/2005 |
| RU | 2250564 | 4/2005 |
| RU | 2257008 | 7/2005 |
| RU | 2267224 | 12/2005 |
| RU | 2005129079 A | 2/2006 |
| RU | 2285338 C2 | 10/2006 |
| RU | 2285351 C2 | 10/2006 |
| RU | 2292655 | 1/2007 |
| RU | 2335864 C2 | 10/2008 |
| RU | 2349043 C2 | 3/2009 |
| SU | 1320883 | 6/1987 |
| TW | 508960 B | 11/2002 |
| TW | 510132 | 11/2002 |
| TW | 200302642 | 8/2003 |
| TW | 200401572 | 1/2004 |
| TW | I232040 | 5/2005 |
| TW | 248266 | 1/2006 |
| TW | 200718128 | 5/2007 |
| WO | WO9408432 | 4/1994 |
| WO | WO9521494 A1 | 8/1995 |
| WO | WO9613920 A1 | 5/1996 |
| WO | WO9701256 | 1/1997 |
| WO | WO9737456 A2 | 10/1997 |
| WO | WO9746033 A2 | 12/1997 |
| WO | WO9800946 A2 | 1/1998 |
| WO | WO9814026 A1 | 4/1998 |
| WO | WO9837706 A2 | 8/1998 |
| WO | WO9848581 A1 | 10/1998 |
| WO | WO9853561 A2 | 11/1998 |
| WO | WO9854919 A2 | 12/1998 |
| WO | WO9941871 A1 | 8/1999 |
| WO | WO9944313 A1 | 9/1999 |
| WO | WO9944383 A1 | 9/1999 |
| WO | WO9952250 A1 | 10/1999 |
| WO | WO9953713 | 10/1999 |
| WO | WO9959265 A1 | 11/1999 |
| WO | WO9960729 A1 | 11/1999 |
| WO | 0004728 | 1/2000 |
| WO | WO0002397 | 1/2000 |
| WO | WO0033503 | 6/2000 |
| WO | 0041542 | 7/2000 |
| WO | 0051389 A1 | 8/2000 |
| WO | WO0070897 | 11/2000 |
| WO | WO0101596 | 1/2001 |
| WO | WO0117125 A1 | 3/2001 |
| WO | WO0126269 | 4/2001 |
| WO | WO0139523 A2 | 5/2001 |
| WO | WO0145300 | 6/2001 |
| WO | WO0148969 | 7/2001 |
| WO | WO0158054 A1 | 8/2001 |
| WO | WO0160106 A1 | 8/2001 |
| WO | 0165637 A2 | 9/2001 |
| WO | WO0169814 A1 | 9/2001 |
| WO | WO0182543 | 11/2001 |
| WO | WO0182544 | 11/2001 |
| WO | WO0189112 A1 | 11/2001 |
| WO | 0195427 A2 | 12/2001 |
| WO | WO0193505 | 12/2001 |
| WO | WO0207375 | 1/2002 |
| WO | WO0224936 A1 | 1/2002 |
| WO | 0215432 A1 | 2/2002 |
| WO | WO0215616 | 2/2002 |
| WO | WO0219746 | 3/2002 |

(56) References Cited

FOREIGN PATENT DOCUMENTS

| | | |
|---|---|---|
| WO | WO0231991 A2 | 4/2002 |
| WO | WO0233848 A2 | 4/2002 |
| WO | 0245293 A2 | 6/2002 |
| WO | WO0245456 A1 | 6/2002 |
| WO | WO0249305 | 6/2002 |
| WO | WO0249306 | 6/2002 |
| WO | WO0249385 A2 | 6/2002 |
| WO | WO02060138 | 8/2002 |
| WO | WO02065675 | 8/2002 |
| WO | WO02082689 A2 | 10/2002 |
| WO | WO02082743 | 10/2002 |
| WO | WO02089434 A1 | 11/2002 |
| WO | WO02093782 A1 | 11/2002 |
| WO | WO02093819 A1 | 11/2002 |
| WO | WO02100027 A1 | 12/2002 |
| WO | WO03001761 A1 | 1/2003 |
| WO | WO03001981 A2 | 1/2003 |
| WO | WO03003617 A2 | 1/2003 |
| WO | WO03001696 | 3/2003 |
| WO | WO03019819 | 3/2003 |
| WO | WO03030414 | 4/2003 |
| WO | WO03034644 A1 | 4/2003 |
| WO | WO03043262 | 5/2003 |
| WO | WO03043369 | 5/2003 |
| WO | 03049409 A2 | 6/2003 |
| WO | WO03058871 A1 | 7/2003 |
| WO | 03069816 A2 | 8/2003 |
| WO | WO03067783 | 8/2003 |
| WO | WO03069832 A1 | 8/2003 |
| WO | WO03073646 | 9/2003 |
| WO | WO03075479 | 9/2003 |
| WO | WO03085876 | 10/2003 |
| WO | WO03088538 A1 | 10/2003 |
| WO | WO03094384 | 11/2003 |
| WO | WO03103331 | 12/2003 |
| WO | WO2004002047 A1 | 12/2003 |
| WO | WO2004004370 | 1/2004 |
| WO | WO2004008671 | 1/2004 |
| WO | WO2004008681 A1 | 1/2004 |
| WO | WO2004015912 | 2/2004 |
| WO | WO2004016007 | 2/2004 |
| WO | WO2004021605 A1 | 3/2004 |
| WO | WO2004023834 A1 | 3/2004 |
| WO | 2004028037 A1 | 4/2004 |
| WO | WO2004030238 A1 | 4/2004 |
| WO | WO2004032443 A1 | 4/2004 |
| WO | 2004038984 A2 | 5/2004 |
| WO | WO2004038954 | 5/2004 |
| WO | WO2004038972 A1 | 5/2004 |
| WO | WO2004038988 A2 | 5/2004 |
| WO | WO2004040690 A2 | 5/2004 |
| WO | WO2004040827 | 5/2004 |
| WO | WO2004047354 | 6/2004 |
| WO | WO2004049618 A1 | 6/2004 |
| WO | WO2004051872 A2 | 6/2004 |
| WO | 2004056022 A2 | 7/2004 |
| WO | WO2004062255 | 7/2004 |
| WO | WO2004064294 | 7/2004 |
| WO | WO2004064295 | 7/2004 |
| WO | WO2004066520 | 8/2004 |
| WO | WO2004068721 A2 | 8/2004 |
| WO | WO2004073276 A1 | 8/2004 |
| WO | WO2004075023 | 9/2004 |
| WO | WO2004075442 | 9/2004 |
| WO | WO2004075448 | 9/2004 |
| WO | WO2004075468 | 9/2004 |
| WO | WO2004075596 | 9/2004 |
| WO | WO2004077850 A2 | 9/2004 |
| WO | WO2004084509 | 9/2004 |
| WO | WO2004086706 A1 | 10/2004 |
| WO | WO2004086711 | 10/2004 |
| WO | WO2004095730 A1 | 11/2004 |
| WO | WO2004095851 | 11/2004 |
| WO | WO2004095854 | 11/2004 |
| WO | WO2004098072 | 11/2004 |
| WO | WO2004098222 | 11/2004 |
| WO | WO2004102815 | 11/2004 |
| WO | WO2004102816 A2 | 11/2004 |
| WO | 2004114564 A1 | 12/2004 |
| WO | 2004114615 A1 | 12/2004 |
| WO | WO2004105272 A1 | 12/2004 |
| WO | WO2004114549 | 12/2004 |
| WO | WO2005002253 A1 | 1/2005 |
| WO | WO2005011163 A1 | 2/2005 |
| WO | WO2005015795 A1 | 2/2005 |
| WO | WO2005015797 A1 | 2/2005 |
| WO | WO2005015810 | 2/2005 |
| WO | WO2005015941 | 2/2005 |
| WO | WO2005018270 | 2/2005 |
| WO | WO2005020488 A1 | 3/2005 |
| WO | WO2005020490 | 3/2005 |
| WO | WO2005022811 A2 | 3/2005 |
| WO | WO2005025110 A2 | 3/2005 |
| WO | WO2005032004 A1 | 4/2005 |
| WO | 2005043780 A1 | 5/2005 |
| WO | WO2005043855 | 5/2005 |
| WO | WO2005046080 | 5/2005 |
| WO | 2005055465 A1 | 6/2005 |
| WO | WO2005005527 | 6/2005 |
| WO | WO2005055484 A1 | 6/2005 |
| WO | WO2005055527 A1 | 6/2005 |
| WO | WO2005060192 A1 | 6/2005 |
| WO | WO2005065062 | 7/2005 |
| WO | WO2005069538 A1 | 7/2005 |
| WO | WO2005074184 | 8/2005 |
| WO | 2005086440 A1 | 9/2005 |
| WO | WO2005096538 | 10/2005 |
| WO | WO2005122628 | 12/2005 |
| WO | WO2006007292 A2 | 1/2006 |
| WO | WO2006019710 | 2/2006 |
| WO | 2006026344 A | 3/2006 |
| WO | WO2006044487 | 4/2006 |
| WO | 2006062356 A1 | 6/2006 |
| WO | WO2006069300 | 6/2006 |
| WO | WO2006069301 | 6/2006 |
| WO | WO2006069397 | 6/2006 |
| WO | WO2006077696 | 7/2006 |
| WO | WO2006096784 A1 | 9/2006 |
| WO | WO2006099349 A1 | 9/2006 |
| WO | WO2006099545 A1 | 9/2006 |
| WO | WO2006099577 A1 | 9/2006 |
| WO | WO2006127544 A2 | 11/2006 |
| WO | WO2006134032 | 12/2006 |
| WO | WO2006138196 | 12/2006 |
| WO | WO2006138573 | 12/2006 |
| WO | WO2006138581 A2 | 12/2006 |
| WO | 2007022430 A2 | 2/2007 |
| WO | WO2007024934 | 3/2007 |
| WO | WO2007025160 | 3/2007 |
| WO | WO2007051159 A2 | 3/2007 |
| WO | WO2007051159 A2 | 5/2007 |

OTHER PUBLICATIONS

Favre et al: "Self-Adaptive Transmission Procedure" IBM Technical Disclosure Bulletin, IBM Corporation, Sep. 1976, vol. 19, No. 4, pp. 1283-1284, New York, New York.

Groe, et al., "CDMA Mobile Radio Design," Sep. 26, 2001, Artech House, Norwood, MA 02062, pp. 257-259.

Laroia, R. et al: "An integrated approach based on cross-layer optimization—Designing a mobile broadband wireless access network" IEEE Signal Processing Magazine, IEEE Service Center, Piscataway, NJ, US, vol. 21, No. 5, Sep. 2004, pp. 20-28, XP011118149.

Lau, et al., "On the Design of MIMO Block-Fading Channels with Feedback-Link Capacity Constraint," IEEE Transactions on Communications, IEEE Service Center, Piscataway, NJ, US, v. 52, No. 1, Jan. 2004, pp. 62-70, XP001189908.

Lettieri et al: "Adaptive frame length control for improving wireless link throughput, range, and energy efficiency", INFOCOM 98, 17th Annual Joint Conference of the IEEE Computer and Communications Societies, Mar. 29-Apr. 2, 1998, pp. 564-571, vol. 2, IEEE San Francisco, CA, New York, New York.

(56) References Cited

OTHER PUBLICATIONS

Molisch, et al., MIMO systems with antenna selection, IEEE Microwave Magazine, URL: http://ieeexplore.ieee.org/iel5/6668/28677/01284943.pdf, Retrieved on Dec. 8, 2006, pp. 46-56 (2004).
Tomcik, J.: "QFDD Technology Overview Presentation," IEEE 802.20 Working Group on Mobile Broadband Wireless Access, Slides/pp. 1-73, Nov. 15, 2005.
Tomcik, J.: "MBFDD and MBTDD Wideband Mode: Technology Overview," IEEE 802.20 Working Group Mobile Broadband Wireless Access, Jan. 2006, pp. 1-109, XP002429968.
Toufik I et al., "Channel allocation algorithms for multi-carrier systems", Vehicular Technology Conference, 2004. VTC2004-Fall. 2004 IEEE 60th Los Angeles, CA, USA Sep. 26-29, 2004, pp. 1129-1133, XP010786798, ISBN: 70-7803-8521-7.
TIA-1121.001 "Physical Layer for Ultra Mobile Broadband (UMB) Air Interface Specification," 3GPP2 C.S0084-001-0, Version 2.0 (Aug. 2007).
TIA-1121.002 "Medium Access Control Layer for Ultra Mobile Broadband (UMB) Air Interface Specification," 3GPP2 C. S0084-002-0, Version 2.0 (Aug. 2007).
International Preliminary Report on Patentability—PCT/US06/060292, International Bureau of WIPO—Geneva, Switzerland, Apr. 29, 2008.
International Preliminary Report on Patentability—PCT/US06/060332, International Bureau of WIPO—Geneva, Switzerland, Apr. 29, 2008.
International Search Report—PCT/US06/060292, International Search Authority—European Patent Office, Apr. 20, 2007.
International Search Report—PCT/US06/060332, International Search Authority—European Patent Office, Apr. 19, 2007.
Written Opinion—PCT/US06/060292, International Search Authority—European Patent Office, Apr. 20, 2007.
Written Opinion—PCT/US06/060332, International Search Authority—European Patent Office, Apr. 19, 2007.
Das,Arnab, et al. "Adaptive, asynchronous incremental redundancy (A-IR) with fixed transmission time intervals TTI for HSDPA." IEEE, pp. 10-83-1087.
"European Search Report—EP10011743, Search Authority—Munich Patent Office, Dec. 20, 2010".
European Search Report—EP10012081, Search Authority—Munich Patent Office, Dec. 17, 2010.
European Search Report—EP10012082, Search Authority—Munich Patent Office, Dec. 20, 2010.
European Search Report—EP10012083, Search Authority—Munich Patent Office, Dec. 30, 2010.
Guo, K. Et al.: "Providing end-to-end QoS for multimedia applications in 3G wireless networks," Proceedings vol. 5242, SPIE ITCom 2003 Conf. Internet Multimedia Management Systems IV, Nov. 26, 2003, pp. 1-14, DOI: 10.1117/12.514061.
Sumii, Kenji et al.: "A Study on Computational Complexity Reduction of Iterative Decoding for Turbo-coded MIMO-SDM Using Sphere Decoding," Technical Report of IEICE. RCS, Nov. 9, 2010, vol. 104, No. 675, pp. 43-48.
Taiwanese Search Report—095139893—TIPO—Dec. 30, 2010.
Translation of Office Action in Chinese Application 2006800295980 corresponding to U.S. Appl. No. 11/260,895, citing CN1346221 and CN1383631 dated Feb. 16, 2011.
Translation of Office Action in Japan application 2008-538193 corresponding to U.S. Appl. No. 11/261,065, citing JP11196109, JP10322304 and JP09008725 dated Mar. 8, 2011.
Translation of Office Action in Korean application 10-2007-7031029 corresponding to U.S. Appl. No. 11/260,931, citing US20030202491 and KR20040063057 dated Jan. 28, 2011.
Translation of Office Action in Canadian application 2625987 corresponding to U.S. Appl. No. 11/261,065, citing CA2557369 dated Apr. 12, 2011.
Translation of Office Action in Chinese application 200680040236.1 corresponding to U.S. Appl. No. 11/261,065, citing US20040048609 and CN1402916 dated Feb. 17, 2011.
Translation of Office Action in Chinese application 200680048265.2 corresponding to U.S. Appl. No. 11/260,931, citing US6904097, WO2004095851, CN1344451 dated Jan. 26, 2011.
Translation of Office Action in Chinese application 200680048832.4 corresponding to U.S. Appl. No. 11/261,158, citing CN1132474 dated Dec. 31, 2010.
Translation of Office Action in Japanese Application 2008-514880 corresponding to U.S. Appl. No. 11/445,377, citing JP2007519281 and JP2006505172 dated Nov. 9, 2010.
Translation of Office Action in Japanese application 2008-528103 corresponding to U.S. Appl. No. 11/260,924, citing JP2005502218, JP2004534456, JP2003348047, JP2003199173, JP2004529524, JP11508417, JP2001238269, JP2005130491 and JP2003500909 dated Feb. 8, 2011.
Translation of Office Action in Japanese Application 2008-529216 corresponding to U.S. Appl. No. 11/261,159, citing GB2348776 , WO2004098222, WO2005065062 and WO2004102815.Dated Jan. 1, 2011.
Translation of Office Action in Japanese application 2008-538181 corresponding to U.S. Appl. No. 11/511,735, citing WO04064295, JP2002515203, JP8288927, JP7336323 and JP200157545 dated Jan. 25, 2011.
Voltz, P. J.,"Characterization of the optimum transmitter correlation matrix for MIMO with antenna subset selection", IEEE Transactions on Communications, vol. 51, No. 11, pp. 1779-1782, (Nov. 1, 2003).
Yongmei Dai,; Sumei Sun; Zhongding Lei; Yuan Li.: "A List Sphere Decoder based turbo receiver for groupwise space time trellis coded (GSTTC) systems," 2004 IEEE 59th Vehicular Technology Conference, vol. 2, pp. 804-808, May 17, 2004, doi: 10.1109/VETECS. 2004.1388940.
Blum, R. et al: "On Optimum MIMO with Antenna Selection," IEEE International Conference on Communications: Conference Proceedings, vol. 1, Apr. 28, 2002, pp. 386-390.
Catreux, S. et al.: "Simulation results for an interference-limited multiple input multiple output cellular system," Global Telecommunications Conference, 2000. GLOBECOM '00. IEEE. Dec. 1, 2000. vol. 2, pp. 1094-1096, http://ieeexplore.ieee.org/iel5/7153/19260/00891306.pdf?tp=&isnumber=19260&arnumber=8913063 &punumber=7153.
Chung, S. et al.: "Low complexity algorithm for rate and power quantization in extended V-BLAST" VTC Fall 2001. IEEE 54th. Vehicular Technology Conference Proceedings. Atlantic City, NJ, Oct. 7-11, 2001, vol. 1 of 4, pp. 910-914, Conf. 54.
El Gamal, H. et al.: "Universal Space-Time Coding," IEEE Transactions on Information Theory, vol. 49, Issue 5, pp. 1097-1119, XP011074756, ISSN: 0018-9448, May 2003.
Hochwald, B. et al., "Achieving near-capacity on a multiple-antenna channel," IEEE Transactions on Communications, IEEE Service Center, Piscataway, New Jersey, vol. 51, No. 3, pp. 389-399 (2003).
Kiessling, M. et al., "Short-term and long-term diagonalization of correlated MIMO channels with adaptive modulation" IEEE International Symposium on Personal, Indoor and Mobile Radio Communications, vol. 2, Sep. 15, 2002, pp. 593-597.
Kousa, M. et al: "Adaptive Binary Coding for Diversity Communication Systems" IEEE International Conference on Personal Wireless Communications Proceedings, pp. 80-84, XP000992269, (1997).
Maniatis, I. et al., "Pilots for joint channel estimation in multi-user OFDM mobile radio systems," Spread Spectrum Techniques and Applications, 2002 IEEE Seventh International Symposium, Sep. 2, 2002, pp. 44-48, XP010615562.
Nokia, "Uplink Considerations for UTRA LTE", 3GPP TSG RAN WG1#40bis, Beijing, CN, R1-050251, 3GPP, Apr. 4, 2005, pp. 1-9.
NTT DoCoMo, "Downlink Multiple Access Scheme for Evolved UTRA", 3GPP R1- 050249, 3GPP, Apr. 4, 2005, pp. 1-8.
Prasad, N. et al.: "Analysis of Decision Feedback Detection for MIMO Rayleigh Fading Channels and Optimum Allocation of Transmitter Powers and QAM Constellations," pp. 1-10, 39th Annual Conference on Comm. Control and Comput., Monticello, IL Oct. 2001.
Qualcomm Europe: "Description and link simulations for OFDMA based E-UTRA uplink" 3GPP Draft; R1-051100, 3rd Generation Partnership Project (3GPP), Mobile Competence Centre; Sophia-

(56) References Cited

OTHER PUBLICATIONS

Antipolis Cedex, France, vol. RAB WG1, no. San Diego, USA; 20051004, Oct. 4, 2005, pp. 1-10, XP050100715.
S. Nishimura et al., "Downlink Nullforming by a Receiving Antenna Selection for a MIMO/SDMA Channel", Technical Search Report of Electric Information Communication Academic Conference, Feb. 28, 2002, vol. 101, No. 683, pp. 17-22, RCS 2001-286.
Tomcik, T.: "QTDD Performance Report 2", IEEE C802.20-05/88, IEEE 802.20 Working Group on Mobile Broadband Wireless Access, http://ieee802.org/20/, pp. 1-56, XP002386798 (Nov. 15, 2005).
Widdup, B. et al., "A highly-parallel VLSI architecture for a list sphere detector," IEEE International Conference, Paris, France, vol. 5, pp. 2720-2725 (2004).
Wiesel, A. et al.:"Efficient implementation of sphere demodulation" Signal Processing Advances in Wireless Communications, 2003. SPAWC 200 3. 4th IEEE Workshop on Rome. Italy Jun. 15-18, 2003, Piscataway, NJ, USA, IEEE, US, Jun. 15, 2003, pp. 36-40, XP010713463.
John B. Groe, Lawrence E. Larson, "CDMA Mobile Radio Design" Sep. 26, 2001, Artech House, Norwood MA02062 580530, XP002397967, pp. 157-159.
Kappes, J.M., and Sayegh S. 1, "Programmable Demultiplexer/Demodulator Processor," COMSAT Laboratories, IEEE, 1990. pp. 230-234.
NTT Docomo, et al.: "Orthogonal Common Pilot Channel and Scrambling Code in Evolved UTRA Downlink," 3GPP TSG RAN WG1 #42 on LTE, pp. 1-8 (Aug.-Sep. 2005).
TIA/EIA/IS-2000 "Standards For CDMA2000 Spread Spectrum Systems" Version 1.0 Jul. 1999.
TIA/EIA/IS-95 "Mobile Station-Base Station Compatibility Standard For Dual-Mode Wideband Spread Spectrum Cellular System" Jul. 1993.
3GPP TS 33.220 V. 1. 1. 0 XX,XX, "3rd Generation Partnership Projects; Technical Specification Group Services and System Aspects; Generic Authentication Architecture (GAA); Generic Bootstrapping Architecture (Release 6)" Feb. 9, 2004, pp. 1-17, figure 4, XP002996023.
3rd Generation Partnership Project; Technical Specification Group Radio Access Network; Physical Layer Aspects for Evolved UTRA (Release 7), 3GPP TR 25.814 v0.3.1 (2005-2011)
B. Sklar: "The process of thus correcting the channel-induced distortion is called equalization". Digital Communications, PTR Pretence Hall, Upper Saddle River, New Jersey, 1998, Formatting and Baseband Transmission, Chap. 2, Section 2.11.2, pp. 104-105.
Bahai, Saltzberg: "System Architecture," Multi-Carrier Digital Communications, Kluwer Academic, New York, NY, XP-002199501, 1999, pp. 17-21.
Bingham: "Other Types of MCM," ADSL, VDSL, and Multicarrier Modulation, John Wiley & Sons, New York, XP-002199502, 2000, pp. 111-113.
Carl R. Nassar, Balasubramaniam Natarajan and Steve Shattil: Introduction of Carrier Interference to Spread Spectrum Multiple Access, Apr. 1999, IEEE, pp. 1-5.
Chennakeshu, et al. "A Comparison of Diversity Schemes for A Mixed-Mode Slow Frequency-Hopped Cellular System,"IEEE, 1993. pp. 1749-1753.
Chennakeshu, et al. "Capacity Analysis Of a TDMA-Based Slow-Frequency-Hopped Cellular System," IEEE Transaction On Vehicular Technology, vol. 45, No. 3 Aug. 1996, pp. 531-542.
Chiani, et al. "Outage Evaluation for Slow Frequency-Hopping Mobile Radio Systems" IEEE Transactions on Communications, vol. 47, No. 12, pp. 1865-1874, Dec. 1999.
Choi et al., "Design of the Optimum Pilot Pattern for Channel Estimation in OFDM Systems." Global Telecommunications Conference, IEEE Communications Society, Globecom, Dallas, Texas (2004), pp. 3661-3665.
Czylwik: "Comparison Between Adaptive OFDM and Single Carrier Modulation with Frequency Domain Equalization," IEEE 47th Vehicular Technology Conference, vol. 2, May 4-7, 1997, pp. 865-869.

Das, et al. "On The Reverse Link Interference Structure For Next Generation Cellular Systems," European Microwave Conference, Oct. 11, 2004, pp. 3068-3072.
Dinis, et al., "A Multiple Access Scheme for the Uplink of Broadband Wireless Systems," IEEE Global Telecommunications Conference, 2004, Globecom '04. vol. 60. Nov. 29-Dec. 2004. pp. 3808-3812.
Fuchs, et al., "A Novel Tree-Based Scheduling Algorithm For the Downlink of Multi-User MIMO Systems with ZF Beamforming,"IEEE International Conference on Acoustics, Speech, and Signal Processing, 2005, Proceedings, Philadelphia, PA, pp. 1121-1124.
Hermann Rohling et al., : "Performance Comparison Of Different Multiple Access Schemes For the Downlink of an OFDM Communication System", Vehicular Technology Conference, 1997, 47th IEEE, vol. 3, May 4-7 1997, pp. 1365-1369.
Hill, et al., "Cyclic Shifting and Time Inversion of Partial Transmit Sequences to Reduce the Peak-to-Average Power Ratio in OFDM," IEEE International Symposium on Personal, Indoor and Mobile Radio Communications, vol. 2, Sep. 18, 2000, Piscataway, NJ, pp. 1256-1259.
J.S. Chow and J.M. Cioffi "A cost-effective maximum likelihood receiver for multicarrier systems", Proc. IEEE Int. Conf. On Comm., pp. 948-952, Jun. 1992.
Je, et al. "A Novel Multiple Access Scheme For Uplink Cellular Systems," IEEE Vehicular Technology Conference, Sep. 26, 2004, pp. 984-988.
Kaleh: "Channel Equilization for Block Transmission Systems," IEEE Journal on Selected Areas in Communications, vol. 13, No. 1, Jan. 1995, pp. 110-121.
Karsten Bruninghaus et al., "Multi-Carrier Spread Spectrum and It's relationship to Single-Carrier Transmission", Vehicular technology Conference, 1998, VTC 98, 48th IEEE, vol. 3, May 18-21, 1998, pp. 2329-2332.
Keller, et al.: "Adaptive Multicarrier Modulation: A Convenient Framework for the Time-Frequency Processing in Wireless Communications," Proceedings of the IEEE, vol. 88, No. 5, May 2000, pp. 611-640.
Kim, et al. "Performance of TDMA System With SFH and 2-BIT Differentially Detected GMSK Over Rayleigh Fading Channel," IEEE Vehicular Technology Conference, Apr. 28, 1996, pp. 789-793.
Kishiyama et al., Investigation of optimum pilot channel structure for VSF-OFCDM broadband wireless access in forward link, VTC 2003-Spring, The 57th IEEE Semiannual Vehicular Technology Conference, Proceedings JEJU, Korea, Apr. 22-25, 2003, pp. 139-144.
Kostic, et al. "Dynamic Frequency Hopping in Wireless Cellular Systems-Simulations Of Full-Replacement And Reduced-Overhead Methods," IEEE Vehicular Technology Conference, May 16, 1999, pp. 914-918.
Kostic, et al. "Fundamentals Of Dynamic Frequency Hopping In Cellular Systems," IEEE Journal On Selected Areas In Communications, vol. 19, No. 11, Nov. 2011, pp. 2254-2266.
LaCroix, et al.: "A Study of OFDM Parameters for High Data Rate Radio LAN's," 2000 IEEE 51st Vehicular Technology Conference Proceedings, vol. 2, May 15-18, 2000, pp. 1075-1079.
Leon, et al., "Cyclic Delay Diversity for Single Carrier-Cyclic Prefix Systems," Conference Record of the Thirty-Ninth Asilomar Conference on Signals, Systems and Computers, Oct. 28, 2005, Piscataway, NJ, pp. 519-523.
Lott: "Comparison of Frequency and Time Domain Differential Modulation in an OFDM System for Wireless ATM," 1999 IEEE 49th Vehicular Technology Conference, vol. 2, Jul. 1999, pp. 877-883.
Mignone, et al.: "CD3-OFDM: A New Channel Estimation Method to Improve the Spectrum Efficiency in Digital Terrestrial Television Systems," International Broadcasting Convention, Sep. 14-18, 1995 Conference Publication No. 413, IEE 1995, pp. 122-128.
Naofal, Al-Dhahir; "A Bandwidth-Optimized Reduced-Complexity Equalized Multicarrier Transceiver", IEEE Transactions on Communications, vol. 45, No. 8, Aug. 1997.
Naofal, Al-Dhahir: "Optimum Finite-Length Equalization for Multicarrier Transceivers", IEEE Trans. On Comm., pp. 56-64, Jan. 1996.

(56) References Cited

OTHER PUBLICATIONS

Nassar, Carl R., et al., "High-Performance MC-CDMA via Carrier Interferometry Codes", IEEE Transactions on Vehicular Technology, vol. 50, No. 6, Nov. 2001.
Net Working Group, T. Dierks, C. Allen, CERTICOM; The TLS Protocol Version 1.0; Jan. 1999.
Sari, et al., "Transmission Techniques for Digital Terrestrial TV Broadcasting," IEEE Communications Magazine, Feb. 1995, pp. 100-109.
Schnell, et al, "Application of IFDMA to Mobile Radio Transmissions," IEEE 1998 International Conference on Universal Personal Communications, vol. 2, Oct. 5-9, 1998, pp. 1267-1272.
Schnell, et al., "A Promising New Wideband Multiple-Access Scheme for Future Mobile Communications Systems," European Transactions on Telecommunications, Wiley & Sons, Chichester, GB, vol. 10, No. 4, Jul. 1999, pp. 417-427.
Shattil et al., "Array Control Systems for Multicarrier Protocols Using a Frequency-Shifted Feedback Cavity", IEEE, 1999.
Sklar: "Formatting and Baseband Transmission", Chapter 2, pp. 54, 104-106.
Sorger U. et al., "Interleave FDMA-a new spread-spectrum multiple-access scheme", IEEE Int. Conference on Atlanta, GA, USA Jun. 7-11, 1998, XP010284733.
Tellado, "Multicarrier Modulation with Low Par," Kluwer Academic, Dordrecht, NL, XP-002199500; 2000, pp. 6-11 and 55-60.
Tellambura, "Use of m-sequences for OFDM Peak-to-Average Power Ratio Reduction," Electronics Letters, vol. 33, No. 15, Jul. 17, 1997, pp. 1300-1301.
Torrieri, "Cellular Frequency-Hopping CDMA Systems," IEEE Vehicular Technology Conference, May 16, 1999, pp. 919-925.
Xiaodong, et al., "M-Sequences for OFDM Peak-to-Average Power Ratio Reduction and Error Correction," Electronics Letters, vol. 33, Issue 7, Mar. 27, 1997, pp. 554-555.
Zekri, et al., "DMT Signals with Low Peak-to-Average Power Ratio," Proceedings, IEEE International Symposium on Computers and Communications, Jul. 6-8, 1999, pp. 362-368.
Wang et al., "Improving performance of multi-user OFDM systems using bit-wise interleaver" Electronics letters IEE Stevenage, GB, vol. 37, No. 19, Sep. 13, 2001, pp. 1173-1174 XP006017222.
Yun et al., "Performance Of an LDPC-Coded Frequency-Hopping QFDMA System Based on Resource Allocation in the Uplink" Vehicular Technology Conference 2004, VTO 2004-Spring, 2004 IEEE 59th Milan, Italy May 17-19, 2004, Piscataway, NJ, USA, vol. 4, May 17, 2004. pp. 1925-1928, XP010766497.
European Search Report—EP11007140—Search Authority—Munich—Oct. 28, 2011.
European Search Report—EP11007141—Search Authority—Munich—Oct. 31, 2011.
Sklar, B., "The process of thus correcting the channel-induced distortion is called equalization", Digital Communications, PTR Prentice Hall, Upper Saddle River, New Jersey, 1998, Formatting and Baseband Transmission, Chap. 2, Section 2.11.2, pp. 54,104-106.
Alcatel-Lucent, et al., "Dedicated Reference Signals for Precoding in E-UTRA Downlink" 3GPP Draft; R1-071718, 3rd Generation Partnership Project (3GPP), Mobile Competence Centre; 650, Route Des Lucioles; F-06921 Sophia-Antipolis Cedex; France, vol. RAN WG1, No. St. Julian; 20070403, Apr. 3, 2007, XP050105640 [retrieved on Apr. 3, 2007].
Bengtsson, M. et at, "A Generalization of Weighted Subspace Fitting to Full-Rank Models", IEEE Transactions on Signal Processing, IEEE Service Center, New York, NY, US, vol. 49, No. 5, pp. 1002-1012, May 1, 2001.
Dammann, A. et al., "Beamforming in Combination with Space-Time Diversity for Broadband OFDM Systems", ICC 2002. 2002 IEEE International Conference on Communications. Apr. 28-May 2, 2002, pp. 165-171, XP010589479.
Ken Murakami et al., "Status Toward Standardization at IEEE 802.3ah and items on the construction of GE-PON system," Technical Report of the Institute of Electronics, Information and Communication Engineers, Jun. 13, 2003, vol. 103, No. 124, pp. 1-6, IN2003-24.

Physical Channels and Multiplexing in Evolved UTRA Downlink TSG-RAN Working Group 1 Meeting, XX, XX, vol. RI-050590, Jun. 20, 2005, pp. 1-24, XP003006923 the whole document.
Siemens, "Evolved UTRA uplink scheduling and frequency reuse" [online], 3GPP TSG-RAN WG1 # 41 R1-050476, Internet <URL:http://www.3gpp.org/ftp/tsg_ran/WG1_RL1/TSGR1_41/Docs/R1-050476.zip>, May 9, 2005.
Viswanath, P. et al, "Opportunistic Beamforming Using Dumb Antennas" IEEE Transactions on Information Theory, IEEE USA, vol. 48, No. 6, Jun. 2002, pp. 1277-1294, XP002314708 ISSN: 0018-9448 abstract right-hand column, paragraph 1.
Yatawatta, S. et al., "Energy Efficient Channel Estimation in MIMO Systems", 2005 IEEE International Conference on Acoustics, Speech, and Signal Processing, Mar. 18-23, 2005, Philadelphia, vol. 4, pp. 317-320, Mar. 18, 2005.
Miorandi D., et al., "Analysis of master-slave protocols for real-time industrial communications over IEEE 802.11 WLANs" Industrial Informatics, 2004. INDIN '04, 2nd IEEE International Conference on Berlin, Germany Jun. 24-26, 2004. Piscataway, NJ, USA IEEE, Jun. 24, 2004, pp. 143-148, XP010782619, ISBN 0789385136, Para 3, point B.
Anonymous: "3GPP TS 36.211 V8.0.0; Evolved Universal Terrestrial Radio Access (E-UTRA); Physical channels and modulation (Release 8)" 3rd Generation Partnership Project; Technical Specification Group Radio Access Network, [Online] 2007, XP002520076 Retrieved from the Internet: URL:http://www.Sgpp.org/ftp/Specs/html-i nf o/36211.htm> [retrieved on Sep. 27, 2007] Section 5.
Jim Tomcik, QFDD and QTDD: Technology Overview, IEEE 802.20 Working Group on Mobile Broadband Wireless Access, Oct. 28, 2005, pp. 48-50, URL, http://www.IEEE802.org/20/contribs/C802.20-05-68.zip.
Nokia: "Compact signalling of multi-code allocation for HSDPA", version 2,3GPP R1-02-0018, Jan. 11, 2002.
Bhushan N., "UHDR Overview", C30-20060522-037, Denver, CO, May 22, 2006, pp. 1-115.
Samsung: "Uplink Transmission and Multiplexing for EUTRA", 3GPP Draft; R1-050605 UL Multiplexing, Jun. 16, 2005, XP050111420.
Sethi M, et al., "Code Reuse DS-CDMA—A Space Time Approach", Proceedings of the 2002 IEEE International Conference on Acoustics, Speech, and Signal Processing (ICASSP), pp. 2297-2300, May 13-17, 2002.
Tachikawa (Editor); "W-CDMA Mobile Communication Systems," John Wiley & Sons Ltd., Japan, Maruzen: pp. 82-213, Jun. 25, 2001.
LG Electronics: "PAPR comparison of uplink MA schemes", 3GPP TSG RAN WG1 Meeting #41, R1-050475, May 9-13, 2005, pp. 6.
Motorola,"Uplink Numerology and Frame Structure", 3GPP TAG RAN1 #41 Meeting R1-050397, May 13, 2005.
Samsung Electonics Co. Ltd.; "Uplink Multiple Access and Multiplexing for Evolved UTRA", R1-050439, May 3, 2005, pp. 1-22, XP55018616, Retrieved from the Internet: URL:http://www.3gpp.org/ftp/tsg_ran/WG1_R1/TSGR1/DOCS/ [retrieved on Feb. 7, 2012].
Digital cellular telecommunications system (Phase 2+); General Packet Radio Service (GPRS); Mobile Station (MS)-Base Station System (BSS)interface; Radio Link Control/Medium Access Control (RLC/MAC) protocol (GSM 04.60 version 8.4.1 Release 1999), 3GPP Standard; ETSI EN 301 349, 3rd Generation Partnership Project (3GPP), Mobile Competence Centre; 650, Route Des Lucioles; F-06921 Sophia-Antipolis Cedex; France, No. V8.4.1, Oct. 1, 2000, pp. 1-243, XP050358534.
Tomcik J., "QFDD and QTDD: Proposed Draft Air Interface Specification," IEEE C802.20-05/69, IEEE 802.20 Working Group on Mobile Broadband Wireless Access, Oct. 28, 2005, pp. 1-6, 1-7, 1-16, 6-65, 7-11, 7-33, 7-37~7-55, 9-21, 9-22, 9-24~9-32.
Institute for Infocomm Research et al., "Intra-Node B Macro Diversity based on Cyclic Delay Transmissions", 3GPP TSG RAN WG1 #42 on LTE, R1-050795, Aug. 29-Sep. 2, 2005, pp. 1-5.
Sommer D., et al., "Coherent OFDM transmission at 60 GHz", Vehicular Technology Conference, 1999, VTC 1999-Fall, IEEE VTS 50th Amsterdam, Netherlands Sep. 19-22, 1999, Piscataway, NJ,

(56) References Cited

OTHER PUBLICATIONS

USA, IEEE, US, vol. 3, Sep. 19, 1999, pp. 1545-1549, XP010353233, DOI: 10.1109/VETECF.1999.801553, ISBN: 978-0-7803-5435-7.

Zhang H., "A new space-time-frequency MIMO-OFDM scheme with cyclic delay diversity", Frontiers of Mobile and Wireless Communication, 2004. Proceedings of the IEEE 6th Circuits and Systems Symposium on vol. 2, Jun. 2, 2004, pp. 647-650.

* cited by examiner

SHARED SIGNALING CHANNEL

REFERENCE TO CO-PENDING APPLICATIONS FOR PATENT

The present Application for Patent is related to the following co-pending U.S. Patent Applications:

U.S. patent application Ser. No. 11/261,832, entitled "SCALABLE FREQUENCY BAND OPERATION IN WIRELESS COMMUNICATION SYSTEMS", filed Oct. 27, 2005, and U.S. patent application Ser. No. 11/261,805, entitled "SCALABLE FREQUENCY BAND OPERATION IN WIRELESS COMMUNICATION SYSTEMS", filed Oct. 27, 2005, assigned to the assignee hereof, and expressly incorporated by reference herein; and U.S. patent application Ser. No. 11/260,895, entitled "ADAPTIVE SECTORIZATION IN CELLULAR SYSTEMS", filed Oct. 27, 2005, assigned to the assignee hereof, and expressly incorporated by reference herein.

BACKGROUND

1. Field of the Disclosure

The disclosure relates to the field of wireless communications. More particularly, the disclosure relates to a shared signaling channel in a wireless communication system.

2. Description of Related Art

Wireless communication systems can be configured as multiple access communication systems. In such systems, the communication system can concurrently support multiple users across a predefined set of resources. Communication devices can establish a link in the communication system by requesting access and receiving an access grant.

The resources the wireless communication system grants to the requesting communication device depends, largely, on the type of multiple access system implemented. For example, multiple access systems can allocate resources on the basis of time, frequency, code space, or some combination of factors.

The wireless communication system needs to communicate the allocated resources and track them to ensure that two or more communication devices are not allocated overlapping resources, such that the communication links to the communication devices are not degraded. Additionally, the wireless communication system needs to track the allocated resources in order to track the resources that are released or otherwise available when a communication link is terminated.

The wireless communication system typically allocates resources to communication devices and the corresponding communication links in a centralized manner, such as from a centralized communication device. The resources allocated, and in some cases de-allocated, need to be communicated to the communication devices. Typically, the wireless communication system dedicates one or more communication channels for the transmission of the resource allocation and associated overhead.

However, the amount of resources allocated to the overhead channels typically detracts from the resources and corresponding capacity of the wireless communication system. Resource allocation is an important aspect of the communication system and care needs to be taken to ensure that the channels allocated to resource allocation are robust.

However, the wireless communication system needs to balance the need for a robust resource allocation channel with the need to minimize the adverse effects on the communication channels.

It is desirable to configure resource allocation channels that provide robust communications, yet introduce minimal degradation of system performance.

BRIEF SUMMARY

A shared signaling channel can be used in a wireless communication system to provide signaling messages to access terminals within the system. The shared signaling channel can be assigned to a predetermined number of sub-carriers within any frame. The assignment of a predetermined number of sub-carriers to the shared signaling channel establishes a fixed bandwidth overhead for the channel. The actual sub-carriers assigned to the channel can be varied periodically, and can vary according to a predetermined frequency hopping schedule. The amount of signal power allocated to the signaling channel can vary on a per symbol basis depending on the power requirements of the communication link. The shared signaling channel can direct each message carried on the channel to one or more access terminals. Unicast or otherwise directed messages allow the channel power to be controlled per the needs of individual communication links.

The disclosure includes a method of generating signaling channel messages in a wireless communication system including a plurality of sub-carriers spanning at least a portion of an operating frequency band. The method includes assigning resources corresponding to a predetermined bandwidth allocated to a signaling channel, generating at least one message, encoding the at least one message to generate at least one message symbol, controlling a power density of the at least one message symbol, and modulating at least a portion of the resources allocated to the signaling channel.

The disclosure also includes a method that includes generating at least one message, encoding the at least one message to generate a plurality of message symbols, adjusting a power density associated with the plurality of message symbols, determining a subset of sub-carriers assigned to a signaling channel from the plurality of sub-carriers, and modulating each of the subset of sub-carriers with at least one symbol from the plurality of message symbols.

The disclosure includes an apparatus configured to generate signaling channel messages in a wireless communication system including a plurality of sub-carriers spanning an operating frequency band. The apparatus includes a scheduler configured to assign a subset of the plurality of sub-carriers to a signaling channel, a signaling module configured to generate at least one signaling message, a power control module configured to adjust a power density of the at least one signaling message, and a signal mapper coupled to the scheduler and the signaling module and configured to map symbols from the at least one signaling message to the subset of the plurality of sub-carriers.

The disclosure includes an apparatus that includes means for generating at least one message, means for encoding the at least one message to generate a plurality of message symbols, means for adjusting a power density associated with the plurality of message symbols, means for determining a subset of sub-carriers assigned to a signaling channel from the plurality of sub-carriers, and means for modulating each of the subset of sub-carriers with at least one symbol from the plurality of message symbols.

BRIEF DESCRIPTION OF THE DRAWINGS

The features, objects, and advantages of embodiments of the disclosure will become more apparent from the detailed description set forth below when taken in conjunction with the drawings, in which like elements bear like reference numerals.

DETAILED DESCRIPTION OF EMBODIMENTS OF THE INVENTION

A shared signaling channel (SSCH) in an OFDMA wireless communication system can be used to communicate various signaling and feedback messages implemented within the system. The wireless communication system can implement a SSCH as one of a plurality of forward link communication channels. The SSCH can be simultaneously or concurrently shared among a plurality of access terminals within the communication system.

The wireless communication system can communicate various signaling messages in a forward link SSCH. For example, the wireless communication system can include access grant messages, forward link assignment messages, reverse link assignment messages, as well as any other signaling messages that may be communicated on a forward link channel. The SSCH can also be used to communicate feedback messages to access terminals. The feedback messages can include acknowledgement (ACK) messages confirming successful receipt of access terminal transmissions. The feedback messages can also include reverse link power control messages that are used to instruct a transmitting access terminal to vary its transmit power.

The actual channels utilized in an SSCH may be all or some of the ones described above. Additionally, other channels may be included in SSCH in addition or in lieu of, any of the above channels.

The wireless communication system can allocate a predetermined number of sub-carriers to the SSCH. Assigning a predetermined number of sub-carriers to the SSCH establishes a fixed bandwidth overhead for the channel. The actual sub-carriers assigned to the SSCH can be varied periodically, and can vary according to a predetermined frequency hopping schedule. In one embodiment, the identity of the sub-carriers assigned to the SSCH can vary across each frame.

The amount of power that is allocated to the SSCH can vary depending on the requirements of the communication link carrying the SSCH message. For example, the SSCH power can be increased when the SSCH messages are transmitted to a distant access terminal. Conversely, the SSCH power can be decreased when the SSCH messages are transmitted to a nearby access terminal. If there is no SSCH message to be transmitted, the SSCH need not be allocated any power. Because the power allocated to the SSCH can be varied on a per user basis when unicast messaging is implemented, the SSCH requires a relatively low power overhead. The power allocated to the SSCH increases only as needed by the particular communication link.

The amount of interference that the SSCH contributes to the data channels for the various access terminals can vary based on the sub-carriers assigned to the SSCH and the access terminals, as well as the relative power levels of the SSCH and the data channels. The SSCH contributes substantially no interference for many communication links.

Figure 1:
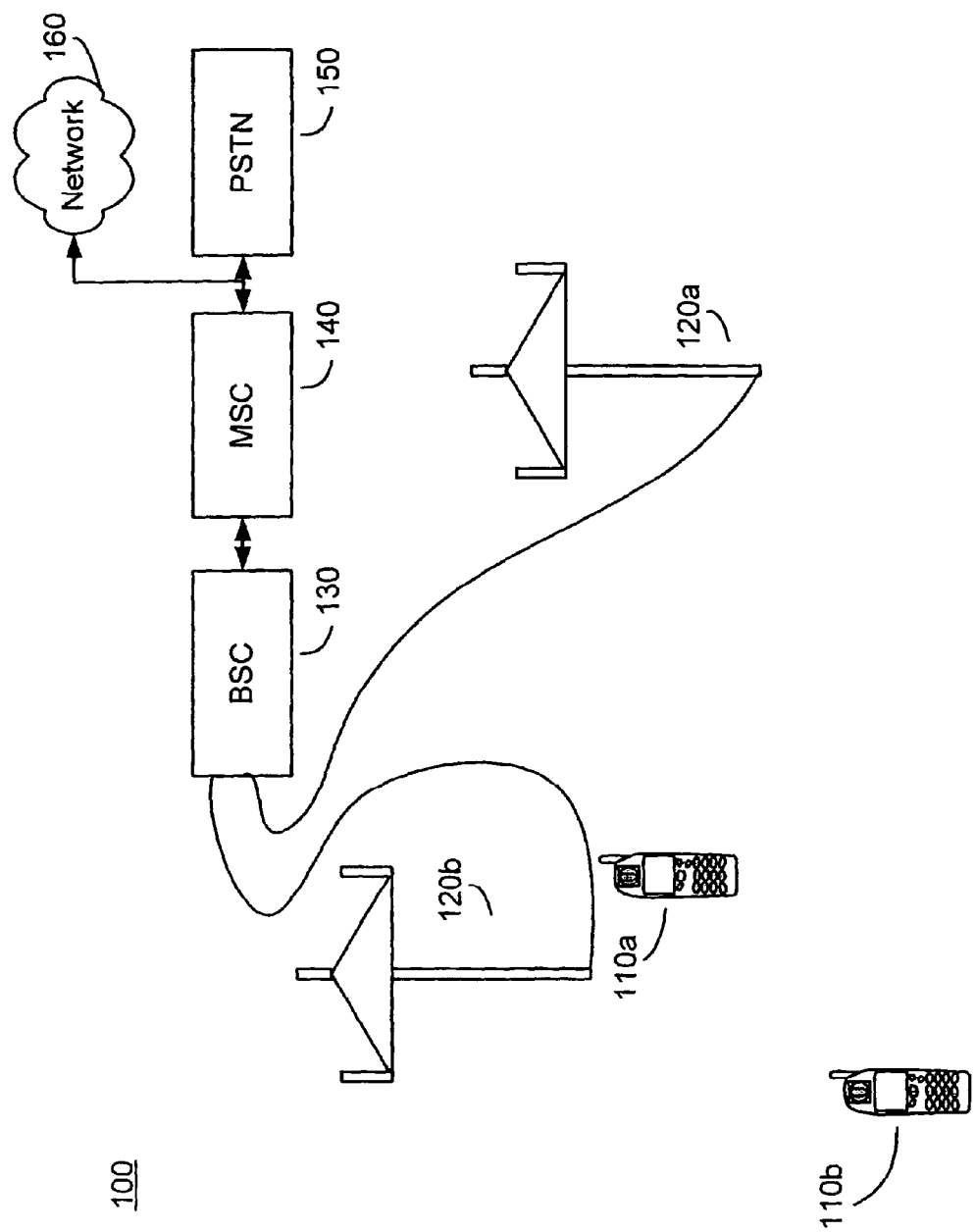
FIG. 1 is a simplified functional block diagram of an embodiment of a communication system having a shared signaling channel.

FIG. 1 is a simplified functional block diagram of an embodiment of a wireless communication system 100 implementing a SSCH on the forward link. The system 100 includes one or more fixed elements that can be in communication with one or more access terminals 110a-110b. Although the description of the system 100 of FIG. 1 generally describes a wireless telephone system or a wireless data communication system, the system 100 is not limited to implementation as a wireless telephone system or a wireless data communication system nor is the system 100 limited to having the particular elements shown in FIG. 1.

Each access terminal 110a-110b can be, for example, a wireless telephone configured to operate according to one or more communication standards. An access terminal 110a can be a portable unit, a mobile unit, or, a stationary unit. Each of the access terminals 110a-110b may also be referred to as a mobile unit, a mobile terminal, a mobile station, a user terminal, user equipment, a portable, a phone, and the like. Although only two access terminals 110a-110b are shown in FIG. 1, it is understood that a typical wireless communication system 100 has the ability to communicate with multiple access terminals 110a-110b.

An access terminal 110a typically communicates with one or more base stations 120a or 120b, here depicted as sectored cellular towers. Other embodiments of the system 100 may include access points in place of the base stations 120a and 120b. In such a system 100 embodiment, the BSC 130 and MSC 140 may be omitted and may be replaced with one or more switches, hubs, or routers.

As used herein, a base station may be a fixed station used for communicating with the terminals and may also be referred to as, and include some or all the functionality of, an access point, a Node B, or some other terminology. An access terminal may also be referred to as, and include some or all the functionality of, a user equipment (UE), a wireless communication device, terminal, a mobile station or some other terminology.

The access terminal 110a will typically communicate with the base station, for example 120b that provides the strongest signal strength at a receiver within the access terminal 110a. A second access terminal 110b can also be configured to communicate with the same base station 120b. However, the second access terminal 110b may be distant from the base station 120b, and may be on the edge of a coverage area served by the base station 120b.

The one or more base stations 120a-120b can be configured to schedule the channel resources used in the forward link, reverse link, or both links. Each base station, 120a-120b, can communicate sub-carrier assignments, acknowledgement messages, reverse link power control messages, and other overhead messages using the SSCH.

Each of the base stations 120a and 120b can be coupled to a Base Station Controller (BSC) 130 that routes the communication signals to and from the appropriate base stations 120a and 120b. The BSC 130 is coupled to a Mobile Switching Center (MSC) 140 that can be configured to operate as an interface between the access terminals 110a-110b and a Public Switched Telephone Network (PSTN) 150. In another embodiment, the system 100 can implement a Packet Data Serving Node (PDSN) in place or in addition to the PSTN 150. The PDSN can operate to interface a packet switched network, such as network 160, with the wireless portion of the system 100.

The MSC 140 can also be configured to operate as an interface between the access terminals 110a-110b and a network 160. The network 160 can be, for example, a Local Area Network (LAN) or a Wide Area Network (WAN). In one embodiment, the network 160 includes the Internet. Therefore, the MSC 140 is coupled to the PSTN 150 and network 160. The MSC 140 can also be configured to coordinate inter-system handoffs with other communication systems (not shown).

The wireless communication system 100 can be configured as an OFDMA system with communications in both the forward link and reverse link utilizing OFDM communications. The term forward link refers to the communication link from the base stations 120a or 120b to the access terminals 110a-110b, and the term reverse link refers to the communication link from the access terminals 110a-110b to the base stations 120a or 120b. Both the base stations 120a and 120b and the access terminals 110a-110b may allocate resources for channel and interference estimation.

The base stations, 120a and 120b, and the access terminal 110 can be configured to broadcast a pilot signal for purposes of channel and interference estimation. The pilot signal can include broadband pilots such as a plurality of CDMA waveforms or a collection of narrow band pilots that span the overall spectrum. The broadband pilots could also be a collection of narrow band pilots staggered in time and frequency.

In one embodiment, the pilot signal can include a number of tones selected from the OFDM frequency set. For example, the pilot signal can be formed from uniformly spaced tones selected from the OFDM frequency set. The uniformly spaced configuration may be referred to as a staggered pilot signal.

The wireless communication system 100 can include a set of sub-carriers, alternatively referred to as tones that span an operating bandwidth of the OFDMA system. Typically, the sub-carriers are equally spaced. The wireless communication system 100 may allocate one or more sub-carriers as guard bands, and the system 100 may not utilize the sub-carriers within the guard bands for communications with the access terminals 110a-110b.

In one embodiment, the wireless communication system 100 can include 2048 sub-carriers spanning an operating frequency band of 20 MHz. A guard band having a bandwidth substantially equal to the bandwidth occupied by one or more sub-carriers can be allocated on each end of the operating band.

The wireless communication system 100 can be configured to Frequency Division Duplex (FDD) the forward and reverse links. In a FDD embodiment, the forward link is frequency offset from the reverse link. Therefore, forward link sub-carriers are frequency offset from the reverse link sub-carriers. Typically, the frequency offset is fixed, such that the forward link channels are separated from the reverse link sub-carriers by a predetermined frequency offset. The forward link and reverse link may communicate simultaneously, or concurrently, using FDD.

In another embodiment, the wireless communication system 100 can be configured to Time Division Duplex (TDD) the forward and reverse links. In such an embodiment, the forward link and reverse link can share the same sub-carriers, and the wireless communication system 100 can alternate between forward and reverse link communications over predetermined time intervals. In TDD, the allocated frequency channels are identical between the forward and reverse links, but the times allocated to the forward and reverse links are distinct. A channel estimate performed on a forward or reverse link channel is typically accurate for the complementary reverse or forward link channel because of reciprocity.

The wireless communication system 100 can also implement an interlacing format in one or both the forward and reverse links. Interlacing is a form of time division multiplexing in which the communication link timing is cyclically assigned to one of a predetermined number of interlace periods. A particular communication link to one of the access terminals, for example 110a, can be assigned to one of the interlace periods, and communications over the particular assigned communication link occurs only during the assigned interlace period. For example, the wireless communication system 100 can implement an interlace period of six. Each interlace period, identified 1-6, has a predetermined duration. Each interlace period occur periodically with a period of six. Thus, a communication link assigned to a particular interlace period is active once every six periods.

Interlaced communications are particularly useful in wireless communication systems 100 implementing an automatic repeat request architecture, such as a Hybrid Automatic Repeat Request (HARQ) algorithm. The wireless communication system 100 can implement a HARQ architecture to process data retransmission. In such a system, a transmitter may send an initial transmission at a first data rate and may automatically retransmit the data if no acknowledgement message is received. The transmitter can send subsequent retransmissions at lower data rates. HARQ incremental redundancy retransmission schemes can improve system performance in terms of providing early termination gain and robustness.

The interlace format allows sufficient time for processing of the ACK messages prior to the next occurring assigned interlace period. For example, an access terminal 110a can receive transmitted data and transmit an acknowledgement message, and a base station 120b can receive and process the acknowledgement message in time to prevent retransmission at the next occurring interlace period. Alternatively, if the base station 120b fails to receive the ACK message, the base station 120b can retransmit the data at the next occurring interlace period assigned to the access terminal 110a.

The base stations 120a-120b can transmit the SSCH messages in each interlace, but may limit the messages occurring in each interlace to those messages intended for access terminals 110a-110b assigned to that particular active interlace. The base stations 120a-120b can limit the amount of SSCH messages that need to be scheduled in each interlace period.

The wireless communication system 100 can implement a Frequency Division Multiplex (FDM) SSCH in the forward link for the communication of signaling and feedback messages. Each base station 120a-120b can allocate a predetermined number of sub-carriers to the SSCH. The wireless communication system 100 can be configured to allocate a fixed bandwidth overhead to the SSCH. Each base station 120a-120b can allocate a predetermined percentage of its sub-carriers to the SSCH. Additionally, each base station 120a or 120b may allocate a different set of sub-carriers to the SSCH or the set of sub-carriers may overlap the SSCH sub-carrier assignment of another base station. For example, each base station 120a or 120b can be configured to allocate approximately 10% of the bandwidth to the SSCH. Thus, in a wireless communication system 100 having up to 2000 sub-carriers that can be allocated to the SSCH, each base station 120a or 120b allocates 200 sub-carriers to the SSCH. Of course other wireless communication systems 100 can be configured with other bandwidth overhead targets. For example, the wireless communication system 100 can have a target SSCH bandwidth allocation that is 2%, 5%, 7%, 15%, 20% or some other number, based on the projected channel loading.

Each base station, for example 120b, can allocate a plurality of nodes from a channel tree to the SSCH. The channel tree is a channel model that can include a plurality of branches that eventually terminate in leaf or base nodes. Each node in the tree can be labeled, and each node identifies every node and base node beneath it. A leaf or base node of the tree can correspond to the smallest assignable resource, such as a single sub-carrier. Thus, the channel tree provides a logical map for assigning and tracking the available sub-carrier resources in the wireless communication system 100.

The base station 120b can map the nodes from the channel tree to physical sub-carriers used in the forward and reverse links. For example, the base station 120b can allocate a predetermined number of resources to the SSCH by assigning a corresponding number of base nodes from a channel tree to the SSCH. The base station 120b can map the logical node assignment to a physical sub-carrier assignment that ultimately is transmitted by base station 120b.

It may be advantageous to use the logical channel tree structure or some other logical structure to track the resources assigned to the SSCH when the physical sub-carrier assignments can change. For example, the base stations 120a-120b can implement a frequency hopping algorithm for the SSCH as well as other channels, such as data channels. The base stations 120a-120b can implement a pseudorandom frequency hopping scheme for each assigned sub-carrier. The base stations 120a-120b can use the frequency hopping algorithm to map the logical nodes from the channel tree to corresponding physical sub-carrier assignments.

The frequency hopping algorithm can perform frequency hopping on a symbol basis or a block basis. Symbol rate frequency hopping can frequency hop each individual sub-carrier distinct from any other sub-carrier, except that no two node are assigned to the same physical sub-carrier. In block hopping, a contiguous block of sub-carriers can be configured to frequency hop in a manner that maintains the contiguous block structure. In terms of the channel tree, a branch node that is higher than a leaf node can be assigned to a hopping algorithm. The base nodes under the branch node can follow the hoping algorithm applied to the branch node.

The base station 120a-120b can perform frequency hopping on a periodic basis, such as each frame, a number of frames, or some other predetermined number of OFDM symbols. As used herein, a frame refers to a predetermined structure of OFDM symbols, which may include one or more preamble symbols and one or more data symbols. The receiver can be configured to utilize the same frequency hopping algorithm to determine which sub-carriers are assigned to the SSCH or a corresponding data channel.

The base stations 120a-120b can modulate each of the sub-carriers assigned to the SSCH with the SSCH messages. The messages can include signaling messages and feedback messages. The signaling messages can include access grant messages, forward link assignment block messages, and reverse link block assignment messages. The feedback messages can include acknowledgement (ACK) messages and reverse link power control messages. The actual channels utilized in an SSCH may be all or some of the ones described above. Additionally, other channels may be included in SSCH in addition or in lieu of, any of the above channels.

The access grant message is used by the base station 120b to acknowledge an access attempt by an access terminal 110a and assign a Media Access Control Identification (MACID). The access grant message can also include an initial reverse link channel assignment. The sequence of modulation symbols corresponding to the access grant can be scrambled according to an index of the preceding access probe transmitted by the access terminal 110a. This scrambling enables the access terminal 110a to respond only to access grant blocks that correspond to the probe sequence that it transmitted.

The base station 120b can use the forward and reverse link access block messages to provide forward or reverse link sub-carrier assignments. The assignment messages can also include other parameters, such as modulation format, coding format, and packet format. The base station typically provides a channel assignment to a particular access terminal 110a, and can identify the target recipient using an assigned MACID.

The base stations 120a-120b typically transmit the ACK messages to particular access terminals 110a-110b in response to successful receipt of a transmission. Each ACK message can be as simple as a one-bit message indicating positive or negative acknowledgement. An ACK message can be linked to each sub-carrier, e.g. by using related nodes in a channel tree to others for that access terminal, or can be linked to a particular MACID. Further, the ACK messages may be encoded over multiple packets for the purposes of diversity.

The base stations 120a-120b can transmit reverse link power control messages to control the power density of reverse link transmissions from each of the access terminals 110a-110b. The base station 120a-120b can transmit the reverse power control message to command the access terminal 110a-110b to increase or decrease its power density.

The base stations 120a-120b can be configured to unicast each of the SSCH messages individually to particular access terminals 110a-110b. In unicast messaging, each message is modulated and power controlled independently from other messages. Alternatively, messages directed to a particular user can be combined and independently modulated and power controlled.

In another embodiment, the base stations 120a-120b can be configured to combine the messages for multiple access terminals 110a-110b and multi-cast the combined message to the multiple access terminals 110a-110b. In multicast, messages for multiple access terminals can be grouped in jointly encoded and power controlled sets. The power control for the jointly encoded messages needs to target the access terminal having the worst communication link. Thus, if the messages for two access terminals 110a and 110b are combined, the base station 120b sets the power control of the combined message to ensure that the access terminal 110a having the worst link receives the transmission. However, the level of power needed to ensure the worst communication link is satisfied may be substantially greater than required for an access terminal 110b at a close proximity to the base station 120b. Therefore, in some embodiments SSCH messages may be jointly encoded and power controlled for those access terminals having substantially similar channel characteristics, e.g. SNRs, power offsets, etc.

In another embodiment, the base stations 120a-120b can group all of the message information for all access terminals 110a-110b served by a base station, for example 120b, and broadcast the combined message to all of the access terminals 110a-110b. In the broadcast approach, all messages are jointly coded and modulated while power control targets the access terminal with the worst forward link signal strength.

Unicast signaling may be advantageous in those situations where multicast and broadcast require substantial power overhead to reach cell edge for a substantial number of bits. Unicast messages may benefit from power sharing between access terminals with different forward link signal strength through power control. Unicast messaging also benefits from the fact that many reverse link base nodes may not be assigned at any given point in time so that no energy needs to be expended reporting an ACK for those nodes.

From the MAC logic standpoint, unicast design enables the wireless communication system 100 to scramble ACK messages with the target MACID, preventing an access terminal that erroneously thinks that it is assigned the relevant resources targeted by the ACK (via assignment signaling errors such as missed de-assignment) from falsely interpreting the ACK that is actually intended for another MACID. Thus, such an access terminal will recover from the erroneous assignment state after a single packet since that packet cannot be positively acknowledged, and the access terminal will expire the erroneous assignment.

From the link performance standpoint, the main advantage of broadcast or multicast methods is coding gain due to joint encoding. However, the gain of power control exceeds substantially coding gain for practical geometry distributions. Also, unicast messaging can exhibit higher error rates compared to jointly encoded and CRC protected messages. However, practically achievable error rates of 0.01% to 0.1% are satisfactory.

It may be advantageous for the base stations 120a-120b to multicast or broadcast some messages while unicasting others. For example, an assignment message can be configured to automatically de-assigns resources from the access terminal that is currently using resources corresponding to the sub-carriers indicated in the assignment message. Hence, assignment messages are often multicast since they target both the intended recipient of the assignment as well as any current users of the resources specified in the assignment message.

Figure 2:
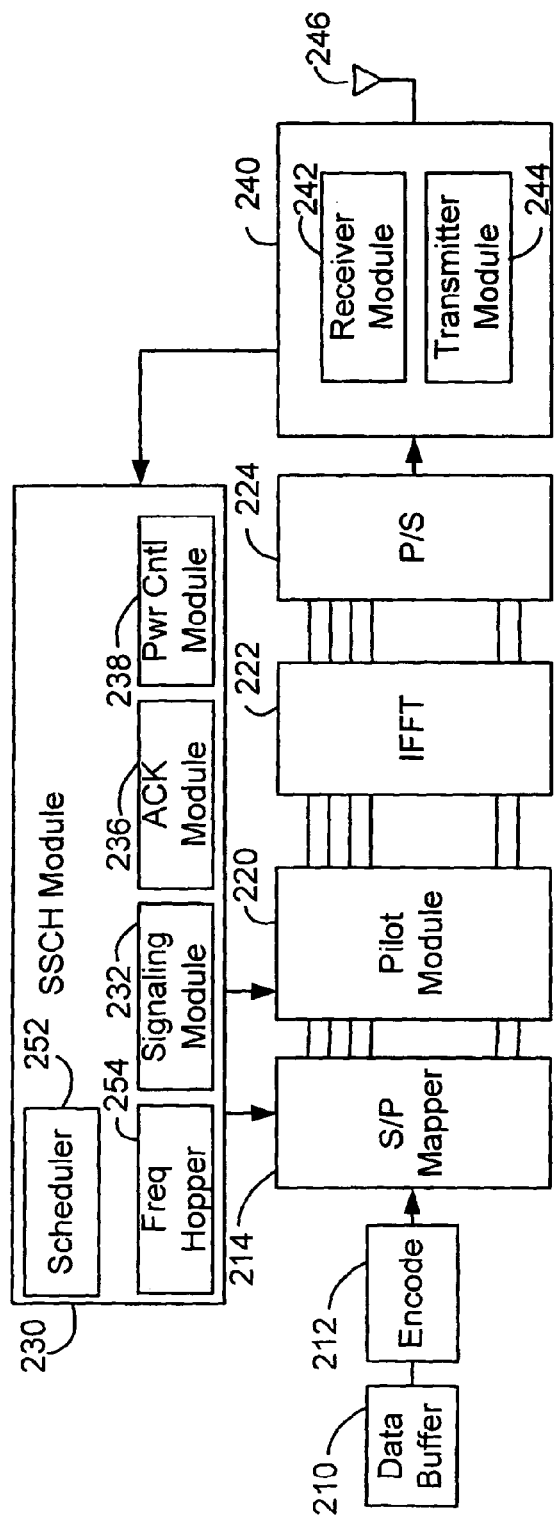
FIG. 2 is a simplified functional block diagram of an embodiment of a transmitter supporting a shared signaling channel.

FIG. 2 is a simplified functional block diagram of an embodiment of an OFDMA transmitter 200 such as can be incorporated within a base station of the wireless communication system of FIG. 1. The transmitter 200 is configured to transmit one or more OFDMA signals to one or more access terminals. The transmitter 200 includes a SSCH module 230 configured to generate and implement a SSCH in the forward link.

The transmitter 200 includes a data buffer 210 configured to store data destined for one or more access terminals. The data buffer 210 can be configured, for example, to hold the data destined for each of the access terminals in a coverage area supported by the corresponding base station.

The data can be, for example, raw unencoded data or encoded data. Typically, the data stored in the data buffer 210 is unencoded, and is coupled to an encoder 212 where it is encoded according to a desired encoding rate. The encoder 212 can include encoding for error detection and Forward Error Correction (FEC). The data in the data buffer 210 can be encoded according to one or more encoding algorithms. Each of the encoding algorithms and resultant coding rates can be associated with a particular data format of a multiple format Hybrid Automatic Repeat Request (HARQ) system. The encoding can include, but is not limited to, convolutional coding, block coding, interleaving, direct sequence spreading, cyclic redundancy coding, and the like, or some other coding.

The encoded data to be transmitted is coupled to a serial to parallel converter and signal mapper 214 that is configured to convert a serial data stream from the encoder 212 to a plurality of data streams in parallel. The signal mapper 214 can determine the number of sub-carriers and the identity of the sub-carriers for each access terminal based on input provided by a scheduler (not shown). The number of carriers allocated to any particular access terminal may be a subset of all available carriers. Therefore, the signal mapper 214 maps data destined for a particular access terminal to those parallel data streams corresponding to the data carriers allocated to that access terminal.

A SSCH module 230 is configured to generate the SSCH messages, encode the messages, and provide the encoded messages to the signal mapper 214. The SSCH module 230 can also provide the identity of the sub-carriers assigned to the SSCH. The SSCH module 230 can include a scheduler 252 configured to determine and assign nodes from a channel tree to the SSCH. The output of the scheduler 252 can be coupled to a frequency hopping module 254. The frequency hopping module 254 can be configured to map the assigned channel tree nodes determined by the scheduler 252 to the physical sub-carrier assignments. The frequency hopping module 254 can implement a predetermined frequency hopping algorithm.

The signal mapper 214 receives the SSCH message symbols and sub-carrier assignments, and maps the SSCH symbols to the appropriate sub-carriers. In one embodiment, the SSCH module 230 can be configured to generate a serial message stream and the signal mapper 214 can be configured to map the serial message to the assigned sub-carriers.

In one embodiment, the signal mapper 214 can be configured to interleave each modulation symbol from the SSCH message across all of the assigned sub-carriers. Interleaving the modulation symbols for the SSCH provides the SSCH signal with the maximum frequency and interference diversity.

The output of the serial to parallel converter/signal mapper 214 is coupled to a pilot module 220 that is configured to allocate a predetermined portion of the sub-carriers to a pilot signal. In one embodiment, the pilot signal can include a plurality of equally spaced sub-carriers spanning substantially the entire operating band. The pilot module 220 can be configured to modulate each of the carriers of the OFDMA system with a corresponding data or pilot signal.

Transmitting signaling blocks using the highest possible spectral efficiency is desirable to minimize bandwidth overhead of signaling messages. However, the downside of high spectral efficiency is the need for a higher energy per bit ($E_b/N_0$), which drives power overhead. Spectral efficiencies between 0.5 bps/Hz and 1 bps/Hz have been found to be a good compromise as they allow for a low bandwidth overhead while achieving minimum ($E_b/N_0$) requirements. However, other spectral efficiencies may be suitable for some systems.

In one embodiment, the SSCH symbols are used to BPSK modulate the assigned sub-carriers. In another embodiment, the SSCH symbols are used to QPSK modulate the assigned sub-carriers. While practically any modulation type can be accommodated, it may be advantageous to use a modulation format that has a constellation that can be represented by a rotating phasor, because the magnitude does not vary as a function of the symbol. This may be beneficial because SSCH may then have different offsets but the same pilot references, and thereby be easier to demodulate.

The output of the pilot module 220 is coupled to an Inverse Fast Fourier Transform (IFFT) module 222. The IFFT module 222 is configured to transform the OFDMA carriers to corresponding time domain symbols. Of course, a Fast Fourier Transform (FFT) implementation is not a requirement, and a Discrete Fourier Transform (DFT) or some other type of transform can be used to generate the time domain symbols. The output of the IFFT module 222 is coupled to a parallel to serial converter 224 that is configured to convert the parallel time domain symbols to a serial stream.

The serial OFDMA symbol stream is coupled from the parallel to serial converter 224 to a transceiver 240. In the embodiment shown in FIG. 2, the transceiver 240 is a base station transceiver configured to transmit the forward link signals and receive reverse link signals.

The transceiver 240 includes a forward link transmitter module 244 that is configured to convert the serial symbol stream to an analog signal at an appropriate frequency for broadcast to access terminals via an antenna 246. The transceiver 240 can also include a reverse link receiver module 242 that is coupled to the antenna 246 and is configured to receive the signals transmitted by one or more remote access terminals.

The SSCH module 230 is configured to generate the SSCH messages. As described earlier, The SSCH messages can include signaling messages. Additionally, the SSCH messages can include feedback messages, such as ACK messages or power control messages. The SSCH module 230 is coupled to the output of the receiver module 242 and analyzes the received signals, in part, to generate the signaling and feedback messages.

The SSCH module 230 includes a signaling module 232, an ACK module 236, and a power control module 238. The signaling module 232 can be configured to generate the desired signaling messages and encode them according to the desired encoding. For example, the signaling module 232 can analyze the received signal for an access request and can generate an access grant message directed to the originating access terminal. The signaling module 232 can also generate and encode any forward link or reverse link block assignment messages.

Similarly, the ACK module 236 can generate ACK messages directed to access terminals for which a transmission was successfully received. The ACK module 236 can be configured to generate unicast, multicast, or broadcast messages, depending on the system configuration.

The power control module 238 can be configured to generate any reverse link power control messages based in part on the received signals. The power control module 238 can also be configured to generate the desired power control messages.

The power control module 238 can also be configured to generate the power control signals that control the power density of the SSCH messages. The SSCH module 230 can power control individual unicast messages based on the needs of the destination access terminal. Additionally, the SSCH module 230 can be configured to power control the multicast or broadcast messages based on the weakest forward link signal strength reported by the access terminals. The power control module 238 can be configured to scale the encoded symbols from each of the modules within the SSCH module 230. In another embodiment, the power control module 238 can be configured to provide control signals to the pilot module 220 to scale the desired SSCH symbols. The power control module 238 thus allows the SSCH module 230 to power control each of the SSCH messages according to its needs. This results in reduced power overhead for the SSCH.

Figure 3:
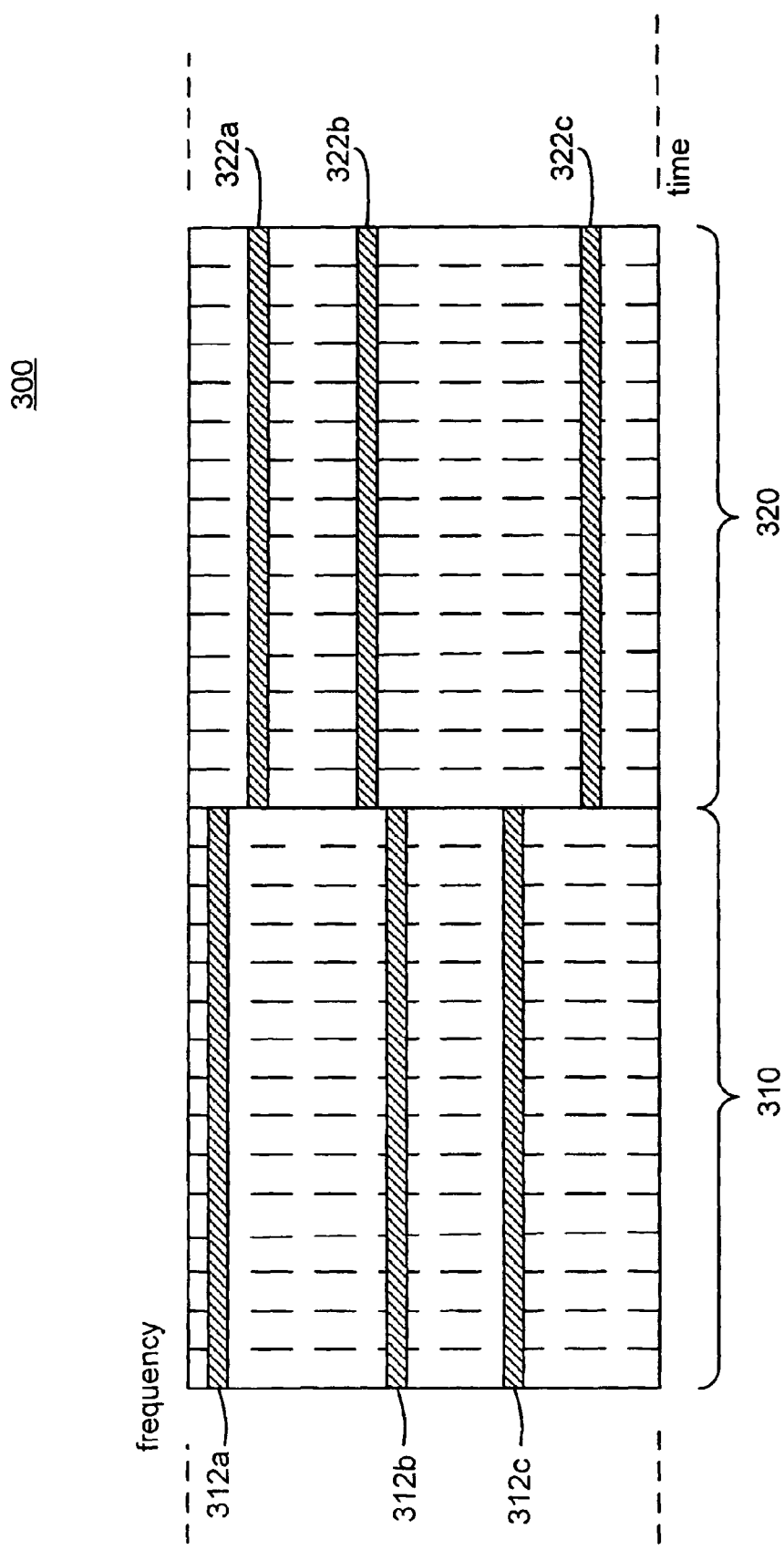
FIG. 3 is a simplified time-frequency diagram of an embodiment of a shared signaling channel.

FIG. 3 is a simplified time-frequency diagram 300 of an embodiment of a shared signaling channel, such a channel generated by the SSCH module of the transmitter of FIG. 2. The time frequency diagram 300 details the SSCH sub-carrier allocation for two successive frames, 310 and 320. The two successive frames 310 and 320 can represent the successive frames of an FDM system or a TDM system, although the successive frames in a TDM system may have one or more intervening frames allocated to reverse link access terminal transmissions (not shown).

The first frame 310 includes three frequency bands, 312a-312c, that can be representative of three separate sub-carriers assigned to the SSCH in the particular frame. The three sub-carrier assignments 312a-312c are shown as maintained over the entire duration of the frame 310. In some embodiments, the sub-carrier assignments can change during the course of the frame 310. The number of times that the sub-carrier assignments can change during the course of a frame 310 is defined by the frequency hopping algorithm, and is typically less than the number of OFDM symbols in the frame 310.

In the embodiment shown in FIG. 3, the sub-carrier assignment changes on the frame boundary. The second, successive frame 320 also includes the same number of sub-carriers assigned to the SSCH as in the first frame 310. In one embodiment, the number of sub-carriers assigned to the SSCH is predetermined and fixed. For example, the SSCH bandwidth overhead can be fixed to some predetermined level. In another embodiment, the number of sub-carriers assigned to the SSCH is variable, and can be assigned by a system control message. Typically, the number of sub-carriers assigned to the SSCH does not vary at a high rate.

The sub-carriers mapped to the SSCH can be determined by a frequency hopping algorithm that maps a logical node assignment to a physical sub-carrier assignment. In the embodiment shown in FIG. 3, the three sub-carrier physical assignments 322a-322c are different in the second, successive frame 320. As before, the embodiment depicts the sub-carrier assignments as stable for the entire length of the frame 320.

Figure 4:
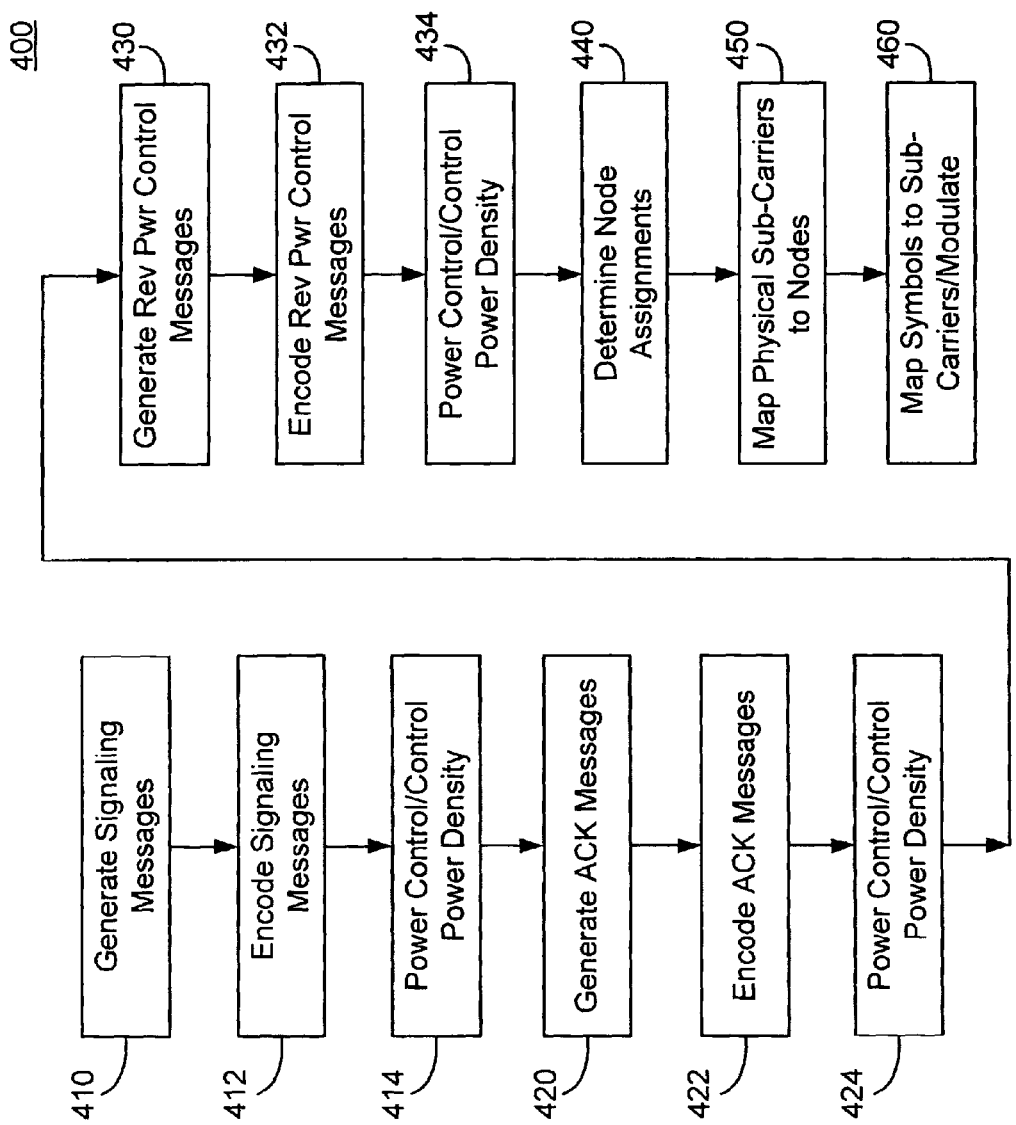
FIG. 4 is a simplified flowchart of an embodiment of a method of generating shared signaling channel messages.

FIG. 4 is a simplified flowchart of an embodiment of a method 400 of generating shared signaling channel messages. The transmitter having the SSCH module as shown in FIG. 2 can be configured to perform the method 400. The method 400 depicts the generation of one frame of SSCH messages. The method 400 can be repeated for additional frames.

The method 400 begins at block 410 where the SSCH module generates the signaling messages. The SSCH module can generate signaling messages in response to requests. For example, the SSCH module can generate access grant messages in response to access requests. Similarly, the SSCH module can generate forward link or reverse link assignment block messages in response to a link request or a request to transmit data.

The SSCH module proceeds to block 412 and encodes the signaling messages. The SSCH can be configured to generate unicast messages for particular message types, for example access grants. The SSCH module can be configured to identify a MACID of a destination access terminal when formatting a unicast message. The SSCH module can encode the message and can generate a CRC code and append the CRC to the message. Additionally, the SSCH can be configured to combine the messages for several access terminals into a single multicast or broadcast message and encode the combined messages. The SSCH can, for example, include a MACID designated for broadcast messages. The SSCH can generate a CRC for the combined message and append the CRC to the encoded messages.

The SSCH module can proceed to block 414 to power control the signaling messages. In one embodiment, the SSCH can adjust or otherwise scale the amplitude of the encoded messages. In another embodiment, the SSCH module can direct a modulator to scale the amplitude of the symbols.

The SSCH module then performs similar steps for the generation of ACK and reverse link power control feedback messages. At block 420, the SSCH module generates the desired ACK messages based on received access terminal transmissions. The SSCH module proceeds to block 422 and encodes the ACK messages, for example, as unicast messages. The SSCH module proceeds to block 424 and adjusts the power of the ACK symbols.

The SSCH module proceeds to block 430 and generates reverse link power control messages based, for example, on the received signal strength of each individual access terminal transmission. The SSCH module proceeds to block 432 and encodes the power control messages, typically as unicast messages. The SSCH module proceeds to block 434 and adjusts the power of the reverse link power control message symbols.

The SSCH proceeds to block 440 and determines which nodes from a logical structure, such as a channel tree, are assigned to the SSCH. The SSCH module proceeds to block 450 and maps the physical sub-carrier assignment to the assigned nodes. The SSCH module can use a frequency hopper algorithm to map the logical node assignment to the sub-carrier assignment. The frequency hopper algorithm can be such that the same node assignment can produce different physical sub-carrier assignments for different frames. The frequency hopper can thus provide a level of frequency diversity, as well as some level of interference diversity.

The SSCH proceeds to block 460 and maps the message symbols to the assigned sub-carriers. The SSCH module can be configured to interleave the message symbols among the assigned sub-carriers to introduce diversity to the signal.

The symbols modulate the OFDM sub-carriers, and the modulated sub-carriers are transformed to OFDM symbols that are transmitted to the various access terminals. The SSCH module allows a fixed bandwidth FDM channel to be used for signaling and feedback messages while allowing flexibility in the amount of power overhead that is dedicated to the channel.

Figure 5:
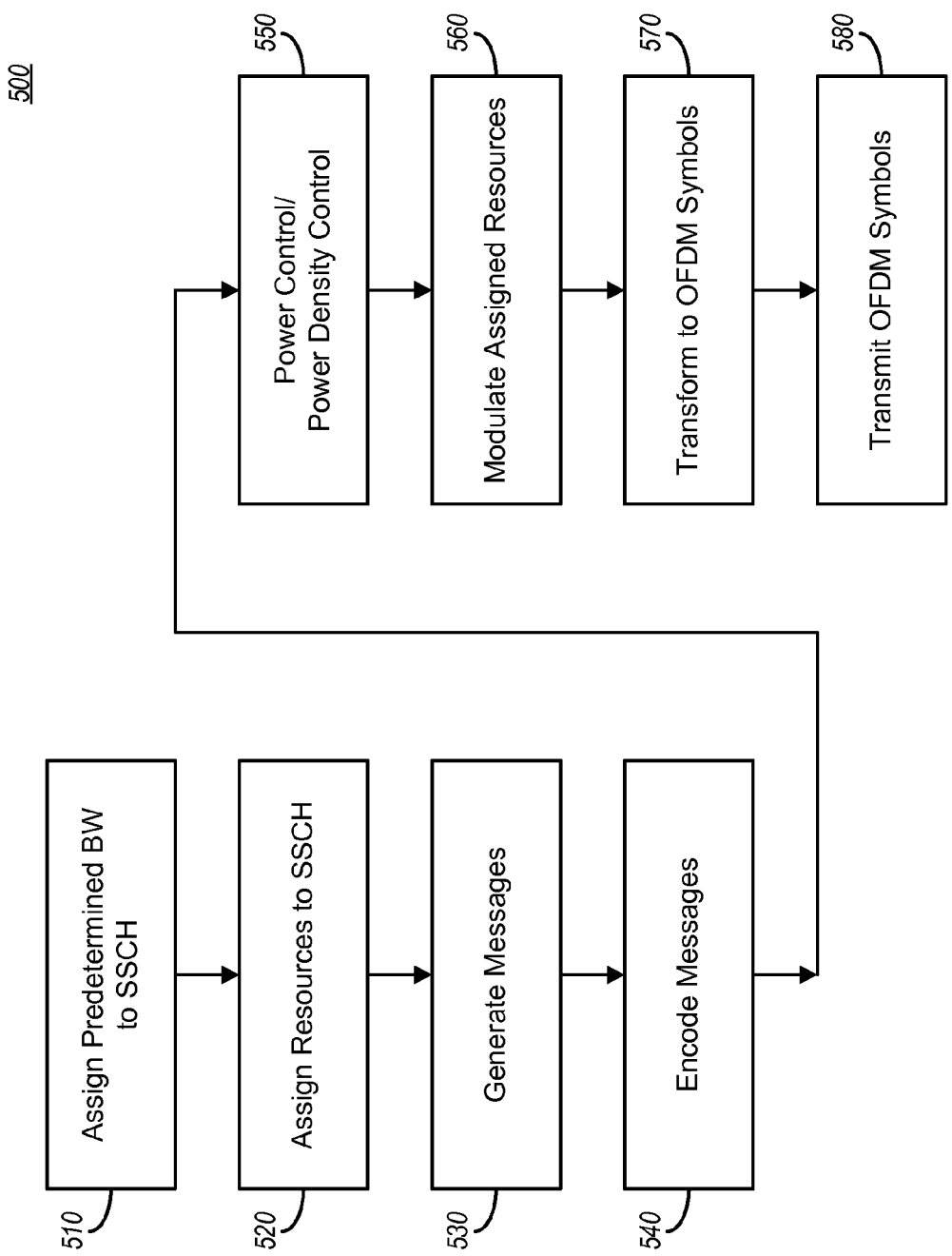
FIG. 5 is a simplified flowchart of an embodiment of a method of generating shared signaling channel messages.

FIG. 5 is a simplified flowchart of another embodiment of a method 500 of generating shared signaling channel messages. The method 500 can be implemented, for example, by the transmitter having the SSCH module shown in FIG. 2.

The method 500 begins at block 510 where the transmitter assigns a predetermined bandwidth to the SSCH. The transmitter can assign a number of sub-carriers of a set of OFDM sub-carriers that is substantially equal to the predetermined bandwidth. For example, the transmitter can assign approximately 10% of the available bandwidth to the SSCH.

The transmitter proceeds to block 520 and assigns resources to the SSCH based on the predetermined bandwidth. In one embodiment, the transmitter can be configured to assign resources based on a logical resource model, such as a channel tree. The channel tree can be organized as a number of branches that split at nodes until reaching a final base node, alternatively referred to as a leaf node. The transmitter can assign the resources by assigning one or more nodes to the SSCH. After assigning the nodes from the channel tree, the transmitter can map the logical nodes to the physical sub-carriers in the OFDM system. The transmitter can assign the nodes based on a logical model in a system where the physical mapping can change over time. For example, the transmitter can implement frequency hopping in the sub-carriers of the SSCH. The transmitter can maintain the initial logical node assignment and can determine the physical sub-carrier mapping based on a predetermined frequency hopping algorithm.

The transmitter proceeds to block 530 and generates the messages that are to be carried over the SSCH. The messages can be nearly any type of signaling or overhead message. For example, the messages can include channel assignment messages directed to access terminals, ACK messages, and reverse link power control messages, as well as other types of overhead messages. The messages can be directed to individual access terminals or can be directed to multiple access terminals. In one embodiment, some or all of the messages can be broadcast messages that are directed to all access terminals within the coverage area served by the SSCH.

After generating the messages, the transmitter proceeds to block 540 and encodes the messages. The messages can be combined and jointly encoded, with a single CRC generated for the combined message. In another embodiment, some of the messages can be unicast messages each directed to a single access terminal and the message can include a CRC based on the unicast message contents. The SSCH messages can include a combination of combined and unicast messages. The transmitter encodes the messages to generate SSCH symbols. In one embodiment, each symbol is configured as a modulation symbol for a corresponding sub-carrier.

The transmitter proceeds to block 550 and adjusts the power density associated with each encoded message. In the case of a unicast message, the transmitter can adjust the power density of the message based on the quality of the communication link between the transmitter and the desired access terminal. In the case of a multicast or broadcast message, the transmitter can adjust the power density of the message based on the worst communication link, which typically corresponds to an access terminal at an edge of the coverage area supported by the SSCH.

The transmitter proceeds to block 560 and modulates the assigned resources with the message symbols. In one embodiment, the transmitter interleaves the message symbols across the assigned sub-carriers by mapping the symbols of a message to an assigned sub-carrier in a round-robin fashion. The transmitter modulates the sub-carrier with the message symbol.

In one embodiment, the transmitter can modulate the sub-carriers using distinct modulation formats based on the message. For example, the transmitter can modulate signaling messages, such as forward link and reverse link block assignment messages using a first modulation format, and can modulate ACK messages or some other message, using a second modulation format. The transmitter can implement various modulation formats, including but not limited to, On-Off-Keying, Binary Phase Shift Keying (BPSK), Quadrature Phase Shift Keying (QPSK), or some other modulation format.

The transmitter proceeds to block 570 and transforms the sub-carriers to OFDM symbols. In one embodiment, the modulation and sub-carrier transformation can be performed by the same module. In other embodiments, the modulation and transformation are distinct. The transmitter can, for example, implement an IFFT module that maps the total set of OFDM sub-carriers to an equivalent sized set of time domain symbols.

The transmitter proceeds to block 580 and transmits the OFDM symbols that include the SSCH. The transmitter can, for example, upconvert the OFDM symbols to a predetermined operating band prior to transmitting the OFDM symbols.

Methods and apparatus for generating a shared signaling channel (SSCH) for an OFDMA wireless communication system have been described herein. The SSCH can be an FDM channel that is assigned a predetermined bandwidth. The predetermined bandwidth establishes an overhead bandwidth used by the SSCH. The overhead bandwidth can be fixed by fixing the number of sub-carriers assigned to the SSCH.

It should be noted that the concept of channels herein refers to information or transmission types that may be transmitted by the access point or access terminal. It does not require or utilize fixed or predetermined blocks of subcarriers, time periods, or other resources dedicated to such transmissions.

The power overhead used by the SSCH can be variable. The messages within the SSCH can be power controlled to a level necessary to satisfy a link requirement. The SSCH messages can be unicast messages and the power of the unicast messages can be controlled to a level dictated by the communication link to the desired access terminal. When multicast or broadcast messages are included, the SSCH can control the power of the combined message to satisfy the worst case communication link experienced by the destination access terminals. The FDM SSCH configuration allows much greater flexibility in the power resources that need to be allocated to support the channel.

The various illustrative logical blocks, modules, and circuits described in connection with the embodiments disclosed herein may be implemented or performed with a general purpose processor, a digital signal processor (DSP), a Reduced Instruction Set Computer (RISC) processor, an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The steps of a method, process, or algorithm described in connection with the embodiments disclosed herein may be embodied directly in hardware, in a software module executed by a processor, or in a combination of the two. A software module may reside in RAM memory, flash memory, non-volatile memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. Further, the various methods may be performed in the order shown in the embodiments or may be performed using a modified order of steps. Additionally, one or more process or method steps may be omitted or one or more process or method steps may be added to the methods and processes. An additional step, block, or action may be added in the beginning, end, or intervening existing elements of the methods and processes.

The above description of the disclosed embodiments is provided to enable any person of ordinary skill in the art to make or use the disclosure. Various modifications to these embodiments will be readily apparent to those of ordinary skill in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

What is claimed is:

1. A method of generating signaling channel messages in a wireless communication system including a plurality of sub-carriers spanning at least a portion of an operating frequency band, the method comprising:
   assigning resources in a predetermined bandwidth to a signaling channel;
   generating at least one message;
   encoding the at least one message to generate at least two message symbols comprising a first message symbol and a second message symbol;
   controlling a power density of the at least two message symbols; and
   modulating at least a portion of the resources assigned to the signaling channel, the modulating comprising
   modulating at least a first sub-carrier assigned to the signaling channel with the first message symbol, and
   modulating at least a second sub-carrier assigned to the signaling channel with the second message symbol.

2. The method of claim 1, further comprising:
   transforming the plurality of sub-carriers, including the first and second sub-carriers within the predetermined bandwidth assigned to the signaling channel, to an OFDM symbol; and
   transmitting the OFDM symbol over a wireless communication link.

3. The method of claim 1, wherein assigning resources comprises:
   determining a number of sub-carriers from the plurality of sub-carriers corresponding to the predetermined bandwidth; and
   assigning a subset of the plurality of sub-carriers equal to the number of sub-carriers to the signaling channel.

4. The method of claim 3, wherein the assigning the subset of the plurality of sub-carriers comprises determining the subset of sub-carriers based in part on a frequency hopping algorithm.

5. The method of claim 1, wherein assigning resources comprises:
   assigning a set of logical resources corresponding to the predetermined bandwidth to the signaling channel; and
   mapping the set of logical resources to a corresponding subset of the plurality of sub-carriers.

6. The method of claim 5, wherein mapping the set of logical resources comprises mapping the set of logical resources to the corresponding subset of the plurality of sub-carriers based in part on a frequency hopping algorithm.

7. The method of claim 5, wherein the corresponding subset of the plurality of sub-carriers is varied periodically by a frequency hopping algorithm.

8. The method of claim 5, wherein the corresponding subset of the plurality of sub-carriers is varied in accordance with a predetermined frequency hopping algorithm.

9. The method of claim 1, wherein generating at least one message comprises generating at least one access grant message directed to a particular access terminal.

10. The method of claim 9, wherein the at least one access grant message comprises a Media Access Control Identification (MACID) corresponding to the particular access terminal.

11. The method of claim 1, wherein generating at least one message comprises generating at least one link assignment block message directed to a plurality of access terminals.

12. The method of claim 11, wherein the at least one link assignment block message comprises a broadcast Media Access Control Identification (MACID).

13. The method of claim 1, wherein generating at least one message comprises generating at least one acknowledgement (ACK) message in response to a received transmission from an access terminal.

14. The method of claim 1, wherein generating at least one message comprises generating at least one power control message directed to a particular access terminal.

15. The method of claim 1, wherein encoding the at least one message comprises:
generating a Cyclic Redundancy Code (CRC) corresponding to a single message; and
appending the CRC to the single message.

16. The method of claim 1, wherein encoding the at least one message comprises:
aggregating multiple messages to generate a combined message;
encoding the combined message; and
appending the combined message with a Cyclic Redundancy Check (CRC) corresponding to the combined message.

17. The method of claim 1, wherein modulating at least the portion of the resources further comprises spreading the at least two message symbols across at least two sub-carriers assigned to the signaling channel.

18. The method of claim 1, wherein generating at least one message comprises generating a unicast message directed to a particular access terminal.

19. The method of claim 1, wherein generating at least one message comprises generating a multicast message directed to a particular group of access terminals.

20. The method of claim 19, wherein controlling the power density comprises selecting the power density based on a worst access terminal in the particular group of access terminals.

21. The method of claim 1, wherein generating at least one message comprises generating a broadcast message directed to any access terminal within a coverage area served by the signaling channel.

22. The method of claim 21, wherein controlling the power density comprises selecting the power density based on a worst access terminal within the coverage area.

23. The method of claim 1, wherein encoding the at least one message comprises
aggregating multiple messages, and
jointly encoding the multiple messages.

24. A method of generating signaling channel messages in a wireless communication system including a plurality of sub-carriers spanning at least a portion of an operating frequency band, the method comprising:
generating at least one message for a signaling channel;
encoding the at least one message to generate at least one message symbol;
adjusting a power density associated with the at least one message symbol;
determining a subset of sub-carriers assigned to the signaling channel from the plurality of sub-carriers; and
modulating the subset of sub-carriers with the at least one message symbol.

25. The method of claim 24, wherein generating at least one message comprises generating a unicast message directed to a particular access terminal.

26. The method of claim 24, wherein generating at least one message comprises generating a multicast message directed to a particular group of access terminals.

27. The method of claim 24, wherein generating at least one message comprises generating a broadcast message directed to any access terminal within a coverage area served by the signaling channel.

28. The method of claim 24, further comprising;
transforming the plurality of sub-carriers to an OFDM symbol; and
transmitting the OFDM symbol over a wireless channel.

29. The method of claim 24, wherein the determining the subset of sub-carriers assigned to the signaling channel comprises determining the subset of sub-carriers based in part on a frequency hopping algorithm.

30. The method of claim 24, wherein the subset of sub-carriers is varied periodically by a frequency hopping algorithm.

31. The method of claim 24, wherein the subset of sub-carriers is varied in accordance with a predetermined frequency hopping algorithm.

32. The method of claim 24, wherein the determining the subset of sub-carriers assigned to the signaling channel comprises
determining logical resources assigned to the signaling channel, and
mapping the logical resources to the subset of sub-carriers.

33. The method of claim 24, wherein the generating at least one message comprises generating an acknowledgement (ACK) message.

34. The method of claim 24, wherein the encoding the at least one message comprises spreading the at least one message.

35. The method of claim 24, wherein the subset of sub-carriers assigned to the signaling channel includes a contiguous block of sub-carriers.

36. The method of claim 24, wherein the subset of sub-carriers is varied with frequency hopping to maintain a contiguous block structure.

37. An apparatus configured to generate signaling channel messages in a wireless communication system including a plurality of sub-carriers spanning at least a portion of an operating frequency band, the apparatus comprising:
means for generating at least one message for a signaling channel;
means for encoding the at least one message to generate at least one message symbol;
means for adjusting a power density associated with the at least one message symbol;
means for determining a subset of sub-carriers assigned to the signaling channel from the plurality of sub-carriers; and
means for modulating the subset of sub-carriers with the at least one message symbol.

38. The apparatus of claim 37, wherein the means for generating the at least one message comprises means for generating a broadcast signaling message.

39. The apparatus of claim 37, wherein the means for generating the at least one message comprises means for generating a unicast signaling message.

40. The apparatus of claim 37, wherein the means for generating the at least one message comprises means for generating a power control message.

41. The apparatus of claim 37, wherein the means for determining the subset of sub-carriers assigned to the signaling channel comprises means for determining the subset of sub-carriers based in part on a frequency hopping algorithm.

42. The apparatus of claim 37, wherein the means for generating at least one message comprises means for generating an acknowledgement (ACK) message.

43. The apparatus of claim 37, wherein the means for encoding the at least one message comprises means for spreading the at least one message.

44. The apparatus of claim 37, wherein the subset of sub-carriers assigned to the signaling channel includes a contiguous block of sub-carriers.

45. The apparatus of claim 44, wherein the subset of sub-carriers is varied with frequency hopping to maintain a contiguous block structure.

46. An apparatus for generating messages in a wireless communication system including a plurality of sub-carriers spanning at least a portion of an operating frequency band, the apparatus comprising:
   means for assigning resources in a predetermined bandwidth to a signaling channel;
   means for generating at least one message;
   means for encoding the at least one message to generate at least two message symbols comprising a first message symbol and a second message symbol;
   means for controlling a power density of the at least two message symbols; and
   means for modulating at least a portion of the resources assigned to the signaling channel, the means for modulating comprising
   means for modulating at least a first sub-carrier assigned to the signaling channel with the first message symbol, and
   means for modulating at least a second sub-carrier assigned to the signaling channel with the second message symbol.

47. The apparatus of claim 46, further comprising:
   means for transforming the plurality of sub-carriers, including the first and second sub-carriers, to an OFDM symbol; and
   means for transmitting the OFDM symbol over a wireless communication link.

48. The apparatus of claim 46, wherein the means for assigning resources comprises:
   means for determining a number of sub-carriers from the plurality of sub-carriers corresponding to the predetermined bandwidth, and
   means for assigning a subset of the plurality of sub-carriers equal to the number of sub-carriers to the signaling channel.

49. The apparatus of claim 46, wherein the means for assigning resources comprises:
   means for assigning a set of logical resources corresponding to the predetermined bandwidth to the signaling channel, and
   means for mapping the set of logical resources to a corresponding subset of the plurality of sub-carriers.

50. The apparatus of claim 49, wherein the means for mapping the set of logical resources comprises means for mapping the set of logical resources to the corresponding subset of the plurality of sub-carriers based in part on a frequency hopping algorithm.

51. The apparatus of claim 49, wherein the corresponding subset of the plurality of sub-carriers is varied periodically by a frequency hopping algorithm.

52. The apparatus of claim 49, wherein the corresponding subset of the plurality of sub-carriers is varied in accordance with a predetermined frequency hopping algorithm.

53. The apparatus of claim 46, wherein the means for generating at least one message comprises means for generating a unicast message directed to a particular access terminal.

54. The apparatus of claim 46, wherein the means for generating at least one message comprises means for generating a multicast message directed to a particular group of access terminals.

55. The apparatus of claim 46, wherein the means for generating at least one message comprises means for generating a broadcast message directed to any access terminal within a coverage area served by the signaling channel.

56. The apparatus of claim 46, wherein the means for encoding the at least one message comprises
   means for aggregating multiple messages, and
   means for jointly encoding the multiple messages.

57. A non-transitory computer-readable medium encoded with a computer program for a wireless communication system including a plurality of sub-carriers spanning at least a portion of an operating frequency band, comprising:
   instructions for assigning resources in a predetermined bandwidth to a signaling channel;
   instructions for generating at least one message;
   instructions for encoding the at least one message to generate at least two message symbols comprising a first message symbol and a second message symbol;
   instructions for controlling a power density of the at least two message symbols; and
   instructions for modulating at least a portion of the resources assigned to the signaling channel, the instructions for modulating comprising
   instructions for modulating at least a first sub-carrier assigned to the signaling channel with the first message symbol, and
   instructions for modulating at least a second sub-carrier assigned to the signaling channel with the second message symbol.

58. A non-transitory computer-readable medium encoded with a computer program for a wireless communication system including a plurality of sub-carriers spanning at least a portion of an operating frequency band, comprising:
   instructions for generating at least one message;
   instructions for encoding the at least one message to generate at least one message symbol;
   instructions for adjusting a power density associated with the at least one message symbol;
   instructions for determining a subset of sub-carriers assigned to a signaling channel from the plurality of sub-carriers; and
   instructions for modulating the subset of sub-carriers with the at least one message symbol.

59. An apparatus configured to generate signaling channel messages in a wireless communication system including a plurality of sub-carriers spanning at least a portion of an operating frequency band, the apparatus comprising:
   at least one processor configured to generate at least one message for a signaling channel, to encode the at least one message to generate at least one message symbol, to adjust a power density associated with the at least one message symbol, to determine a subset of sub-carriers assigned to the signaling channel from the plurality of sub-carriers, and to modulate the subset of sub-carriers with the at least one message symbol; and
   a data buffer configured to store data for the at least one message.

60. The apparatus of claim 59, wherein the at least one processor is configured to generate a unicast message.

61. The apparatus of claim 59, wherein the at least one processor is configured to generate a multicast message.

62. The apparatus of claim 59, wherein the at least one processor is configured to generate a broadcast message.

63. The apparatus of claim 59, wherein the at least one processor is configured to generate an acknowledgement (ACK) message.

64. The apparatus of claim 59, wherein the at least one processor is configured to spread the at least one message.

65. The apparatus of claim 59, wherein the at least one processor is configured to determine the subset of sub-carriers based in part on a frequency hopping algorithm.

66. The apparatus of claim 59, wherein the subset of sub-carriers assigned to the signaling channel includes a contiguous block of sub-carriers.

67. The apparatus of claim 66, wherein the subset of sub-carriers is varied with frequency hopping to maintain a contiguous block structure.

68. An apparatus for generating messages in a wireless communication system including a plurality of sub-carriers spanning at least a portion of an operating frequency band, the apparatus comprising:
- at least one processor configured to assign resources in a predetermined bandwidth to a signaling channel, to generate at least one message, to encode the at least one message to generate at least two message symbols comprising a first message symbol and a second message symbol, to control a power density of the at least two message symbols, to modulate at least a portion of the resources assigned to the signaling channel, to modulate at least a first sub-carrier assigned to the signaling channel with the first message symbol, and to modulate at least a second sub-carrier assigned to the signaling channel with the second message symbol; and
- a data buffer configured to store data for the at least one message.

69. The apparatus of claim 68, wherein the at least one processor is configured to transform the plurality of sub-carriers, including the first and second sub-carriers, to an OFDM symbol, and to transmit the OFDM symbol over a wireless communication link.

70. The apparatus of claim 68, wherein the at least one processor is configured to determine a number of sub-carriers from the plurality of sub-carriers corresponding to the predetermined bandwidth, and to assign a subset of the plurality of sub-carriers equal to the number of sub-carriers to the signaling channel.

71. The apparatus of claim 68, wherein the at least one processor is configured to assign a set of logical resources corresponding to the predetermined bandwidth to the signaling channel, and to map the set of logical resources to a corresponding subset of the plurality of sub-carriers.

72. The apparatus of claim 71, wherein the at least one processor is configured to map the set of logical resources to the corresponding subset of the plurality of sub-carriers based in part on a frequency hopping algorithm.

73. The apparatus of claim 71, wherein the corresponding subset of the plurality of sub-carriers is varied periodically by a frequency hopping algorithm.

74. The apparatus of claim 71, wherein the corresponding subset of the plurality of sub-carriers is varied in accordance with a predetermined frequency hopping algorithm.

75. The apparatus of claim 68, wherein the at least one processor is configured to generate a unicast message.

76. The apparatus of claim 68, wherein the at least one processor is configured to generate a multicast message.

77. The apparatus of claim 68, wherein the at least one processor is configured to generate a broadcast message.

78. The apparatus of claim 68, wherein the at least one processor is configured to aggregate multiple messages and to jointly encode the multiple messages.

\* \* \* \* \*